(12) United States Patent
Nakamura et al.

(10) Patent No.: US 9,449,361 B2
(45) Date of Patent: Sep. 20, 2016

(54) IMAGE PROCESSING APPARATUS AND CONTROL METHOD OF IMAGE PROCESSING APPARATUS

(71) Applicant: Sony Corporation, Tokyo (JP)

(72) Inventors: Sensaburo Nakamura, Kanagawa (JP); Tetsuro Nakata, Kanagawa (JP); Toru Iwama, Kanagawa (JP); Tomohisa Shiga, Kanagawa (JP); Masaki Nishikawa, Kanagawa (JP); Katsuakira Moriwake, Tokyo (JP)

(73) Assignee: SONY CORPORATION, Tokyo (JP)

( * ) Notice: Subject to any disclaimer, the term of this patent is extended or adjusted under 35 U.S.C. 154(b) by 178 days.

(21) Appl. No.: 14/084,749

(22) Filed: Nov. 20, 2013

(65) Prior Publication Data

US 2014/0146056 A1 May 29, 2014

(30) Foreign Application Priority Data

Nov. 26, 2012 (JP) ................................. 2012-257477

(51) Int. Cl.
*G06T 1/20* (2006.01)
*H04N 5/265* (2006.01)
*H04N 19/61* (2014.01)
*H04N 19/40* (2014.01)

(52) U.S. Cl.
CPC .................. *G06T 1/20* (2013.01); *H04N 5/265* (2013.01); *H04N 19/40* (2014.11); *H04N 19/61* (2014.11)

(58) Field of Classification Search
CPC ........ G06T 1/20; H04N 5/265; H04N 19/61; H04N 19/40
USPC ......................................................... 345/501
See application file for complete search history.

(56) References Cited

U.S. PATENT DOCUMENTS

| 7,477,256 B1 * | 1/2009 | Johnson .......................... 345/504 |
| 2006/0277316 A1 * | 12/2006 | Wang et al. .................... 709/231 |
| 2011/0012912 A1 * | 1/2011 | Nakamura et al. ............ 345/582 |
| 2013/0222400 A1 * | 8/2013 | Choi et al. ..................... 345/506 |

* cited by examiner

*Primary Examiner* — Ke Xiao
*Assistant Examiner* — Kim-Thanh T Tran
(74) *Attorney, Agent, or Firm* — Frommer Lawrence & Haug LLP

(57) ABSTRACT

There is provided an image processing apparatus including a graphics processing unit, a first computer that controls the graphics processing unit, an intermediate image storage unit that stores image data generated by the graphics processing unit, an image input unit that inputs a plurality of image data, an image switching unit that outputs a plurality of any image data among the plurality of image data input to the image input unit, an image combining unit that combines image data using the image data output from the image switching unit and the image data stored in the intermediate image storage unit, an image output unit that outputs the image data combined by the image combing unit, a second computer that controls the image switching unit and the image combining unit, and a connecting unit that connects the first computer and the second computer.

19 Claims, 22 Drawing Sheets

IMAGE PROCESSING APPARATUS AND CONTROL METHOD OF IMAGE PROCESSING APPARATUS

CROSS REFERENCE TO RELATED APPLICATIONS

This application claims the benefit of Japanese Priority Patent Application JP 2012-257477 filed Nov. 26, 2012, the entire contents of which are incorporated herein by reference.

BACKGROUND

The present disclosure relates to an image processing apparatus and a control method of the image processing apparatus and more particularly, to an image processing apparatus using a graphics processing unit (GPU).

In the related art, a configuration of an image process using the GPU has been known. In the image process, various special effects are enabled by control of software. Newly generated special effects or computer graphics (CG) can be newly added to the same hardware by addition of new software and an economical configuration that is rich in extensibility is enabled.

A configuration in which a process is shared by other elements as well as the GPU has been known. For example, an information processing apparatus in which a main processor (CPU), a first GPU connected to the CPU through an input/output interface, and a second GPU connected to the first GPU through an external connection interface are provided and a relay interface to allow the CPU to perform communication with the second GPU through the external connection interface is provided in the first GPU has been described in Japanese Patent Application Laid-Open (JP-A) No. 2007-316859.

In addition, an information processing apparatus in which an image to be processed is divided into first and second regions and processes of images of the divided first and second regions are shared and executed by the CPU and the GPU has been described in Japanese Patent Application Laid-Open (JP-A) No. 2012-003619.

SUMMARY

In the configuration including the GPU, an image (permutation of frames synchronized with a synchronization signal) to be input as a video signal can be processed while using the GPU. However, because the GPU is configured to store an input image to a memory once, process the input image, and output the input image, process delay of units of frames is necessarily generated. For example, delay of at least two frames is generated at an input/output and delay of three frames or more is generated to execute a further process.

In a system for magnifying and projecting a photographed lecturer to a projector, for example, in a lecture or a show by live use, because a viewer feels uneasy even though slight delay is generated when a sound is synchronized and is output from a speaker, large delay of units of frames is not preferable. In addition, in the case of a broadcasting program, it is not preferable that delay increase.

Meanwhile, it is demanded to execute an image process with flexible extensibility by software using the GPU, because an added value of an image is raised. When the flexible image process is controlled by the software, a specific value may be generated by a calculation after a parameter change by a manipulation and an unallowable distorted output image may be generated. In this case, it may be difficult to immediately return the distorted image to a normal image in a manipulation to modify parameters.

It is desirable to enable an image process rich in extensibility and maintain an image process of a stabilized operation with small delay.

According to an embodiment of the present technology, there is provided an image processing apparatus including a graphics processing unit, a first computer that controls the graphics processing unit, an intermediate image storage unit that stores image data generated by the graphics processing unit, an image input unit that inputs a plurality of image data, an image switching unit that outputs a plurality of any image data among the plurality of image data input to the image input unit, an image combining unit that combines image data using the image data output from the image switching unit and the image data stored in the intermediate image storage unit, an image output unit that outputs the image data combined by the image combing unit, a second computer that controls the image switching unit and the image combining unit, and a connecting unit that connects the first computer and the second computer.

In the present disclosure, a graphics processing unit (GPU) is included. The GPU is controlled by the first computer. The image data that is generated by the GPU is stored in the intermediate image storage unit.

By the image switching unit, the plurality of any image data among the plurality of image data input by the image input unit are output. By the image combining unit, the image data output from the image switching unit and the image data stored in the intermediate image storage unit are used and the image data is combined. By the image output unit, the image data combined by the image combining unit is output.

The image switching unit and the image combining unit are controlled by the second computer. In this case, the second computer controls the image switching unit and the image combining unit in synchronization with a synchronization signal, that is, a vertical synchronization signal. The second computer is connected to the first computer. Thereby, the first and second computers can perform control in cooperation with each other.

As such, according to the present disclosure, each of a GPU system and a main line system such as the image switching unit or the image combining unit is controlled independently by a separate computer. In the image combining unit, the image data generated by the GPU as well as the input image data can be used through the intermediate image storage unit. For this reason, an image process rich in extensibility is enabled and an image process of a stabilized operation with small delay is maintained.

In the present disclosure, the image processing apparatus may further include an image process state storage unit that stores control data of each unit corresponding to a predetermined image process state. When a restoration of an image process state is instructed, the first computer may perform control to change an image process state of the GPU, on the basis of the control data stored in the image process state storage unit, and the second computer may perform control to change image process states of the image switching unit and the image combining unit, on the basis of the control data stored in the image process state storage unit, in synchronization with a change of the image process state of the GPU. In this case, the second computer may receive the control data from the first computer through the connecting unit.

In this case, the second computer performs a delay operation by only a sum time of a change time (frame number unit) of the image process state of the GPU and a delay time (frame number unit: 1 to 2 frames in general) regarding writing to the intermediate image storage unit and reading from the intermediate image storage unit and performs control with respect to the image switching unit and the image combining unit, so that the second computer can be synchronized with the change of the image process state of the GPU. By this control, a collective change of the image process states of the GPU system and the main line system can be securely performed.

In this case, when storage of the image process state is instructed, control data of the GPU by the first computer and control data of the image switching unit and the image combining unit by the second computer may be stored in the image process state storage unit. At this time, a first image process state storage unit provided in a memory attached to the first computer and a second image process state storage unit provided in a memory attached to the second computer may be provided as the image process state storage unit. The first computer may write control data regarding a portion managed by the first computer to the first image process state storage unit and the second computer may write control data regarding a portion managed by the second computer to the second image process state storage unit.

In this case, the image processing apparatus may further include a user manipulation unit that is connected to the first computer and the user manipulation unit may have a function of inputting an instruction to change restore the image process state. When the instruction to change the image process state is provided by the user manipulation unit, the first computer may transmit the instruction to the second computer through the connecting unit. Thereby, even when the instruction is input to the first computer, the instruction is also transmitted to the second computer and synchronized control of the image process states of the GPU system and the main line system is enabled.

In the present disclosure, the image processing apparatus may further include an input image storage unit that stores the image data input to the image input unit and the GPU may operate by referring to image data read from the input image storage unit. In this case, the input image storage unit may store image data output from the image switching unit. Thereby, a value derived from the input image data can be included in a value generated by the GPU and stored in the intermediate image storage unit.

In the present disclosure, the GPU may generate image data of a foreground image to be overlapped and a key signal thereof and the image combining unit may read the image data of the foreground image and the key signal thereof read from the intermediate image storage unit and overlap the image data of the foreground image to image data of a background image from the image switching unit, on the basis of the key signal.

In the present disclosure, the image processing apparatus may further include an input image storage unit that stores image data input to the image input unit and the first computer may transmit image data from the input image storage unit to an internal storage unit and display an image based on the transmitted image data on a display unit. Thereby, the image based on the input image data can be displayed on the display unit connected to the first computer.

In the present disclosure, the first computer may transmit image data from the intermediate image storage unit to an internal storage unit and display an image based on the transmitted image data on a display unit. Thereby, an image based on the image data generated by the GPU can be displayed on the display unit connected to the first computer.

In the present disclosure, the GPU may write the same image data as the image data written to the intermediate image storage unit to an internal storage unit of the first computer and the first computer may display an image based on image data read from the internal storage unit on a display unit. Thereby, the image based on the image data generated by the GPU can be displayed on the display unit connected to the first computer.

In the present disclosure, the image processing apparatus may further include an output capture unit that captures the image data combined by the image combining unit and supplies the image data to the first computer. Thereby, in the first computer, an image based on the image data combined by the image combining unit can be displayed on the display unit and streams obtained by encoding the image data can be transmitted in a form of streaming.

In this case, the output capture unit may have an encoder and the output capture unit may encode the captured image data by the encoder and supply the image data to the first computer. In this case, because encoding may not be performed in the first computer, load can be alleviated.

In this case, the first computer may display an image based on image data acquired from the output capture unit on a display unit. In addition, in the case, the image processing apparatus may further include a network interface and the first computer may transmit the image data supplied from the output capture unit in a form of streaming through the network interface.

In the present disclosure, the image processing apparatus may further include a sound input unit that inputs a plurality of sound data, a sound combining unit that combines sound data using the sound data input to the sound input unit, and a sound output unit that outputs the sound data combined by the sound combining unit and the second computer may control the sound combining unit.

According to embodiments of the present disclosure described above, an image process rich in extensibility is enabled and an image process of a stabilized operation with small delay can be maintained.

DETAILED DESCRIPTION OF THE EMBODIMENT(S)

Figure 1:
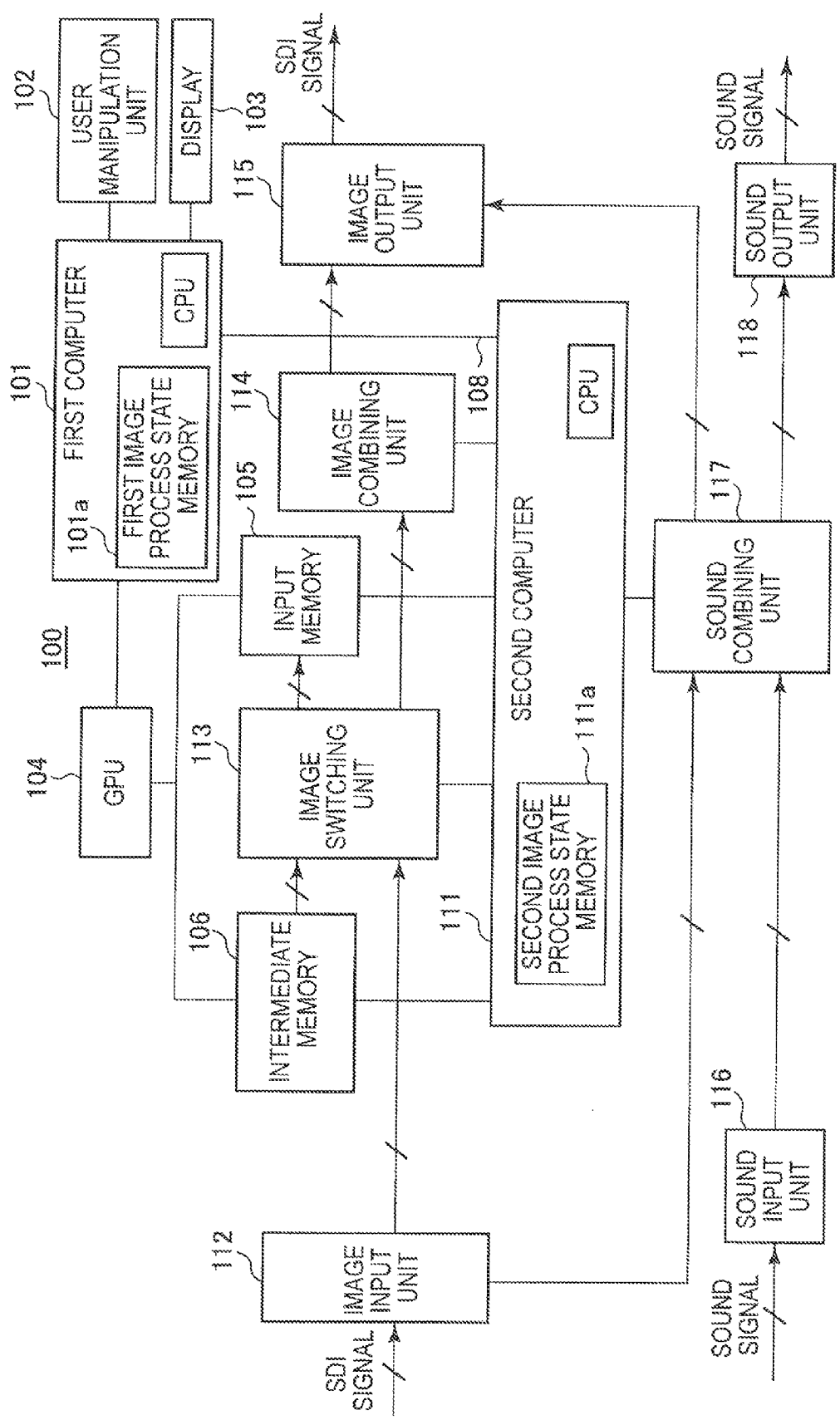
FIG. 1 is a block diagram illustrating a configuration example of an image processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. Embodiment
2. Modification

1. Embodiment

[Configuration of Image Processing Apparatus]

FIG. 1 illustrates a configuration example of an image processing apparatus 100 according to an embodiment of the present disclosure. The image processing apparatus 100 includes a first computer 101, a user manipulation unit 102, a display 103, a graphics processing unit (GPU) 104, an input memory 105, and an intermediate memory 106. Further, the image processing apparatus 100 includes a second computer 111, an image input unit 112, an image switching unit (XPT) 113, an image combining unit (Mixer) 114, an image output unit 115, a sound input unit 116, a sound combining unit (Audio Mixer) 117, and a sound output unit 118.

The first computer 101 is composed of, for example, a microcomputer including a CPU. The user manipulation unit 102 and the display 103 that configure a user interface are connected to the first computer 101. The user manipulation unit 102 is a keyboard, a mouse, or the like. The first computer 101 controls the GPU 104.

The second computer 111 is composed of a microcomputer including the CPU, similar to the first computer 101 described above. The user interface such as the user manipulation unit is not connected to the second computer 111. The second computer 111 is connected to the first computer 101 by a communication line (connecting unit) 108 and can perform communication with the first computer 101. The second computer 111 controls individual hardware units other than the first computer 101 and the GPU 104, in synchronization with a vertical synchronization signal.

The image input unit 112 receives inputs of a plurality of serial digital interface (SDI) signals from the outside. The image input unit 112 converts each SDI signal into image data of an internal format and outputs the image data. In addition, the image input unit 112 extracts embedded sound data from each SDI signal and outputs the sound data.

The image switching unit 113 inputs a plurality of image data output from the image input unit 112 and a predetermined number of image data read from the intermediate memory 106 and outputs a plurality of any image data. That is, the image switching unit 113 selects any one of a plurality of input image data for each of a plurality of output lines (image data buses) and inputs the image data to the image combining unit 114.

In addition, the image switching unit 113 selects one or more image data from the plurality of image data output from the image input unit 112 and inputs the image data to the input memory 105. The image switching unit 113 is controlled by the second computer 111 and performs switching during a vertical blanking period of the image data. The image combining unit 114 combines a predetermined number of image data by overlapping, using the plurality of image data output from the image switching unit 113. The image combining unit 114 is controlled by the second computer 111, similar to the image switching unit 113 described above.

The sound input unit 116 receives inputs of a plurality of sound signals from a microphone. The sound input unit 116 includes an analog/digital conversion circuit (A/D converter) and converts each sound signal from an analog signal to a digital signal, converts the sound signal into sound data of an internal format, and outputs the sound data.

The sound combining unit 117 combines a predetermined number of sound data, using the sound data output from the sound input unit 116 and the sound data output from the image input unit 112. At this time, the sound combining unit 117 can perform level control with respect to a plurality of sound data selected from the plurality of input sound data, combine the sound data, and output the sound data. The sound output unit 118 includes a digital/analog conversion circuit (D/A converter) and converts the sound data combined by the sound combining unit 117 from a digital signal to an analog signal and outputs the sound data. This sound system is controlled by the second computer 111.

The image output unit 115 converts the image data combined by the image combining unit 114 into an SDI signal and outputs the SDI to the outside. At this time, the image output unit 115 embeds the sound data output from the sound combining unit 117 in the SDI signal.

The GPU 104 is composed of an image processing processor. The CPU 104 performs special effects such as reduction and rotation with respect to the image data read from the input memory 105 and writes the image data to the intermediate memory 106. The special effects that are performed in the GPU 104 are controlled by the first computer 101. As a method of controlling image processing, an open graphics library (OpenGL) is known. For example, an instruction using the OpenGL is provided to the GPU 104, from a control program operated on the first computer 101.

The GPU 104 may generate image data such as captains or graphics, in addition to performing the special effects with respect to the input image data. In this case, the GPU 104 can perform special effects to input an input image to letters or graphics.

The input memory 105 includes an embedded memory (RAM) and writes one or more image data (each frame of video signals) output from the image switching unit 105 to the memory. The writing is controlled by the second computer 111. The input memory 105 includes a bus arbiter as a peripheral circuit of the memory. In addition to a memory writing operation, the input memory 105 can be accessed from the GPU 104. The GPU 104 reads image data necessary for a process, from the memory of the input memory 105.

The intermediate memory 106 includes an embedded memory (RAM). The intermediate memory 106 reads the image data from the memory and supplies the image data of the internal format to the image combining unit 114. The reading is controlled by the second computer 111. The intermediate memory 106 includes a bus arbiter as a peripheral circuit of the memory. In addition to a memory reading operation, the intermediate memory 106 can be accessed from the GPU 104. The GPU 104 writes the processed and generated image data to the memory of the intermediate memory 106.

Figure 2:
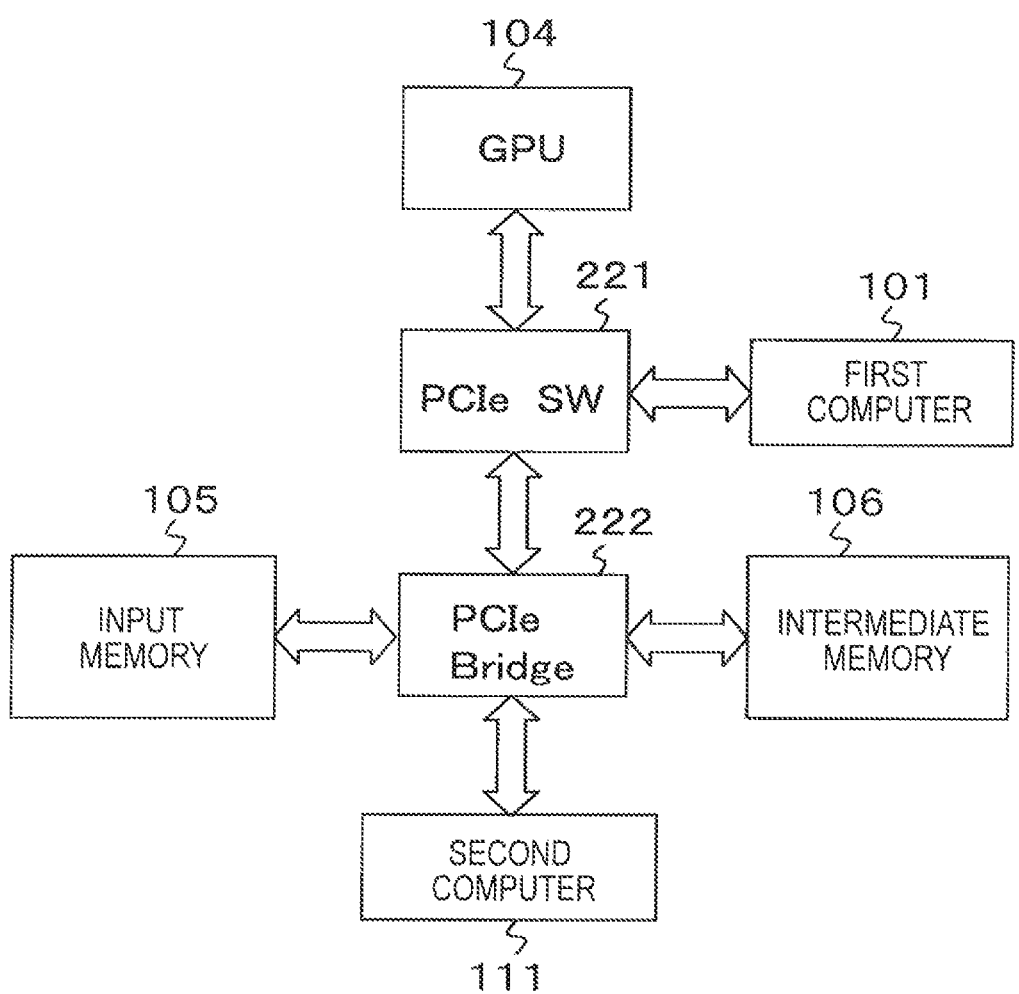
FIG. 2 is a diagram illustrating a connection example using a PCIe (PCI Express) to be a serial transfer interface.

In the image processing apparatus 100 illustrated in FIG. 1, the first computer 101, the GPU 104, the input memory 105, the intermediate memory 106, and the second computer 111 are connected by a PCIe (PCI express) to be a serial transfer interface. FIG. 2 illustrates a connection example using the PCIe. Each device is connected by a PCIe switch 221 and a PCIe bridge 222.

Figure 3:
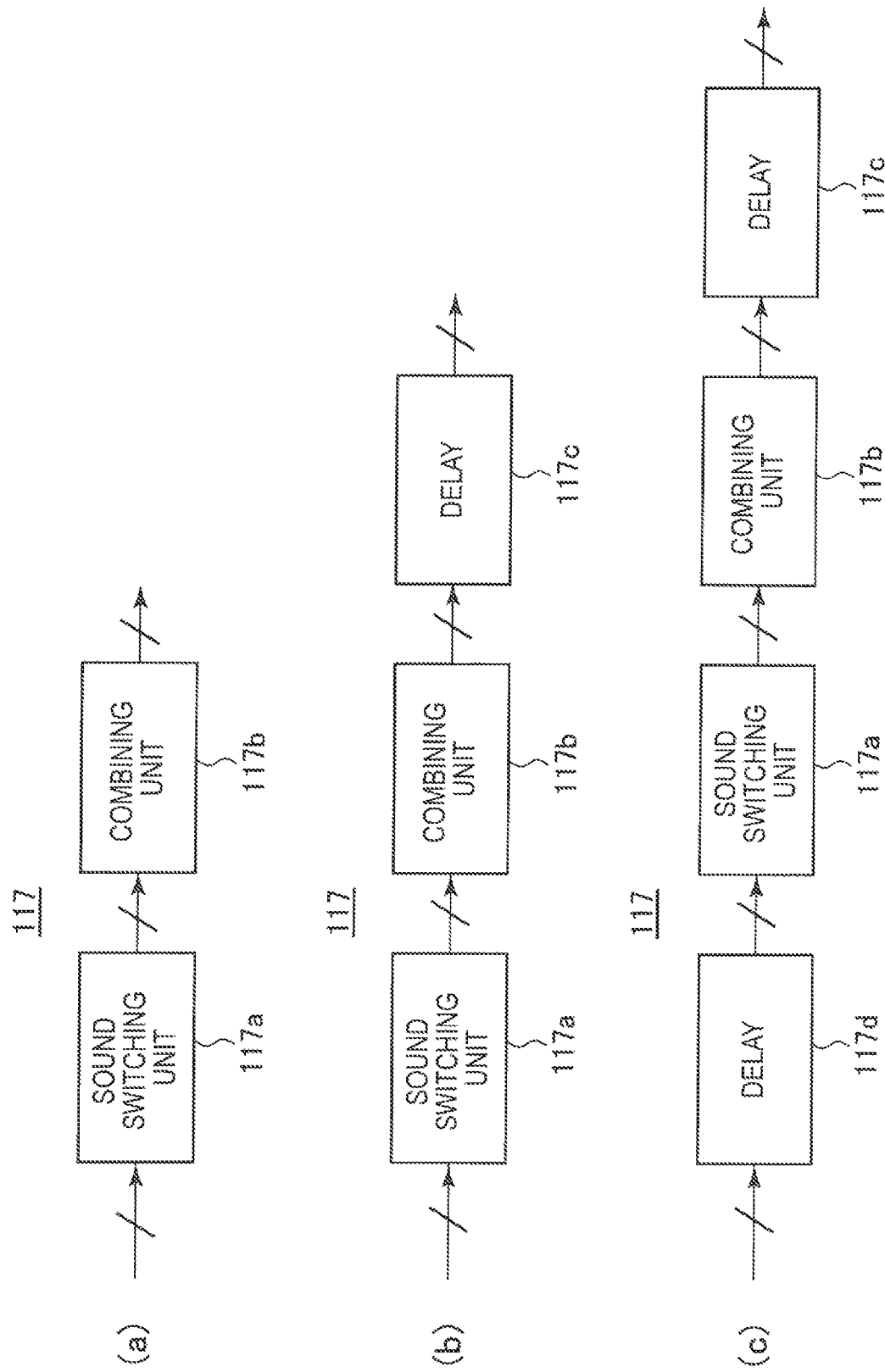
FIG. 3 is a block diagram illustrating a configuration example of a sound combining unit configuring an image processing apparatus.

FIG. 3 illustrates a configuration example of the sound combining unit 117. In a configuration example of FIG. 3(a), the sound combining unit 117 is composed of a series circuit of a sound switching unit 117a and a combining unit 117b. The sound switching unit 117a inputs a plurality of sound data and outputs a plurality of any sound data. That is, the sound switching unit 117a selects any one of a plurality of input sound data for each of a plurality of output lines (sound data buses) and outputs the sound data. The combining unit 117b performs level control with respect to the plurality of sound data output from the sound switching unit 117a, combines the plurality of sound data, generates a plurality of sound data, and outputs the plurality of sound data.

In a configuration example of FIG. 3(b), the sound combining unit 117 is composed of a series circuit of a sound switching unit 117a, a combining unit 117b, and a delay 117c. In the configuration example of FIG. 3(b), the sound switching unit 117a and the combining unit 117b are the same as those in the configuration example of FIG. 3(a) and the delay 117c is additionally provided at an output side.

The delay 117c is provided to add delay to sound data to correspond to a time (frame number) of the image data delayed for a process. In addition, delay control may be used to add delay by the intention of a user. For example, when a microphone is located to be closer to a speaker than a camera and an image becomes an image functioning as a distant view, delay may be added to the sound data and delay natural to a distance may be applied.

In a configuration example of FIG. 3(c), the sound combining unit 117 is composed of a series circuit of a delay 117d, a sound switching unit 117a, a combining unit 117b, and a delay 117c. In the configuration example of FIG. 3(c), the sound switching unit 117a, the combining unit 117b, and the delay 117c are the same as those in the configuration example of FIG. 3(b) and the delay 117d is additionally provided at an input side. By the delay 117d, delay setting is enabled for each input sound data.

A normal operation of the image processing apparatus 100 illustrated in FIG. 1 will be simply described. A plurality of SDI signals are input from the outside to the image input unit 112. In the image input unit 112, each SDI signal is converted into image data of an internal format and the image data is output. In the image input unit 112, embedded sound data is extracted from each SDI signal and is output.

A plurality of image data output from the image input unit 112 are input to the image switching unit 113, under the control of the second computer 111. In addition, image data is read from the intermediate memory 106 and is input to the image switching unit 113. In the image switching unit 113, any one of the plurality of input image data is selected for each of the plurality of output lines and is output. The plurality of image data output from the image switching unit 113 are input to the image combining unit 114.

In addition, in the image switching unit 113, one or more image data are selectively extracted from the plurality of image data output from the image input unit 112 and are input to the input memory 105. In the input memory 105, each input image data is written to the embedded memory.

In the GPU 104, image data is generated under the control of the first computer 101. For example, in the GPU 104, image data is read from the embedded memory of the input memory 105 and special effects such as reduction and rotation are performed with respect to the image data. For example, the GPU 104 generates image data to display captains or graphics, regardless of the input image data. In this case, special effects to insert images into the letters or the graphics may be performed using the image data read from the embedded memory of the input memory 105.

The image data that is generated by the GPU 104 is written to the embedded memory of the intermediate memory 106. Under the control of the second computer 111, the image data is read from the embedded memory of the intermediate memory 106 and is input to the image switching unit 113 as described above.

In the image combining unit 114, under the control of the second computer 111, the image data output from the image switching unit 113 is used and a predetermined number of image data are combined by overlapping. The image data output from the image combining unit 114 is input to the image output unit 115.

A plurality of sound signals are input from the outside to the sound input unit 116. In the sound input unit 116, under the control of the second computer 111, each sound signal is converted from an analog signal to a digital signal, the sound signal is converted into sound data of an internal format, and the sound data is output. The plurality of sound data output from the sound input unit 116 are input to the sound combining unit 117. The plurality of sound data extracted from the SDI signals by the image input unit 112 are also input to the sound combining unit 117.

In the sound combining unit 117, under the control of the second computer 111, the sound data output from the sound input unit 116 and the sound data output from the image input unit 112 are used and the predetermined number of sound data are combined. In this case, in the sound combining unit 117, the level control is performed with respect to the plurality of sound data selected from the plurality of input sound data and the plurality of sound data are combined. The plurality of sound data output from the sound combining unit 117 are input to the image output unit 115 and the sound output unit 118.

In the image output unit 115, under the control of the second computer 111, the image data combined by the image combining unit 114 is converted into an SDI signal and the SDI signal is output to the outside. At this time, in the image output unit 115, the sound data output from the sound combining unit 117 is embedded in the SDI signal. In the sound output unit 118, under the control of the second computer 111, each sound data is converted from a digital signal to an analog signal and is output to the outside.

[Detailed Configuration Example of Image Combining Unit]

Figure 4:
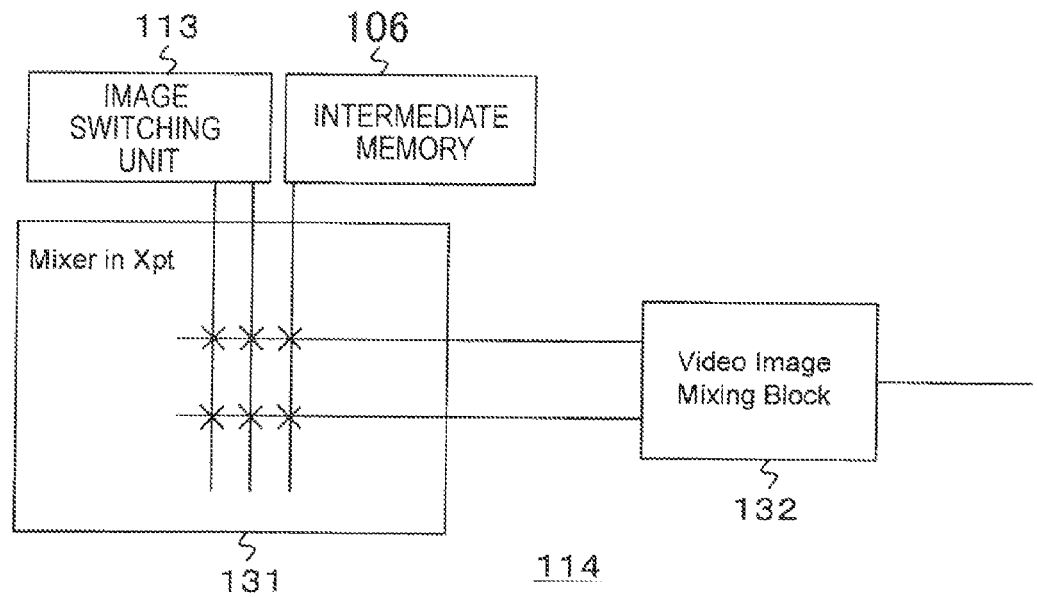
FIG. 4 is a diagram illustrating a configuration example of an image combining unit configuring an image processing apparatus.

FIG. 4 illustrates a configuration example of the image combining unit 114. In FIG. 4, a simplest example is illustrated. In this configuration example, the image combining unit 114 includes a switching unit (Mixer in Xpt) 131 and a combining unit (Video Image Mixing Block) 132. The switching unit 131 extracts first and second image data from the image data output from the image switching unit 113 and the image data output from the intermediate memory 106 and inputs the first and second image data to the combining unit 132. The combining unit 132 performs a transition of cross-fade switching based on combining from the first image data to the second image data.

Figure 5:
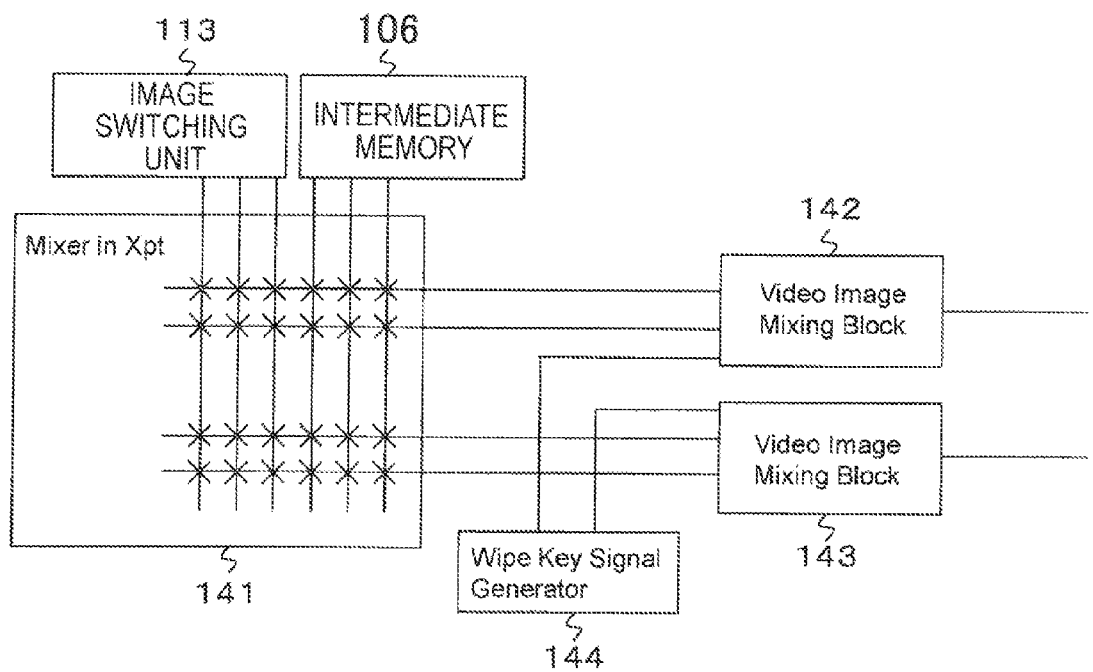
FIG. 5 is a diagram illustrating another configuration example of an image combining unit configuring an image processing apparatus.

FIG. 5 illustrates another configuration example of the image combining unit 114. In FIG. 5, an example of the case in which there are two outputs is illustrated. In this configuration example, a transition to switch two image outputs in parallel can be executed. In this configuration example, the image combining unit 114 includes a switching unit (Mixer in Xpt) 141, two combining units (Video Image Mixing Blocks) 142 and 143, and a wipe key signal generator 144.

The switching unit 141 extracts first and second image data from the image data output from the image switching unit 113 and the image data output from the intermediate memory 106 and inputs the first and second image data to the combining unit 142. In addition, the switching unit 141 extracts third and fourth image data from the image data output from the image switching unit 113 and the image data output from the intermediate memory 106 and inputs the third and fourth image data to the combining unit 143.

The wipe key signal generator 144 generates a wipe key signal to perform image switching based on a wipe and supplies the wipe key signal to the combining units 142 and 143. The combining unit 142 performs the transition of the image switching based on the wipe from the first image data to the second image data, on the basis of the wipe key signal. Likewise, the combining unit 143 performs the transition of the image switching based on the wipe from the third image data to the fourth image data, on the basis of the wipe key signal.

Figure 6:
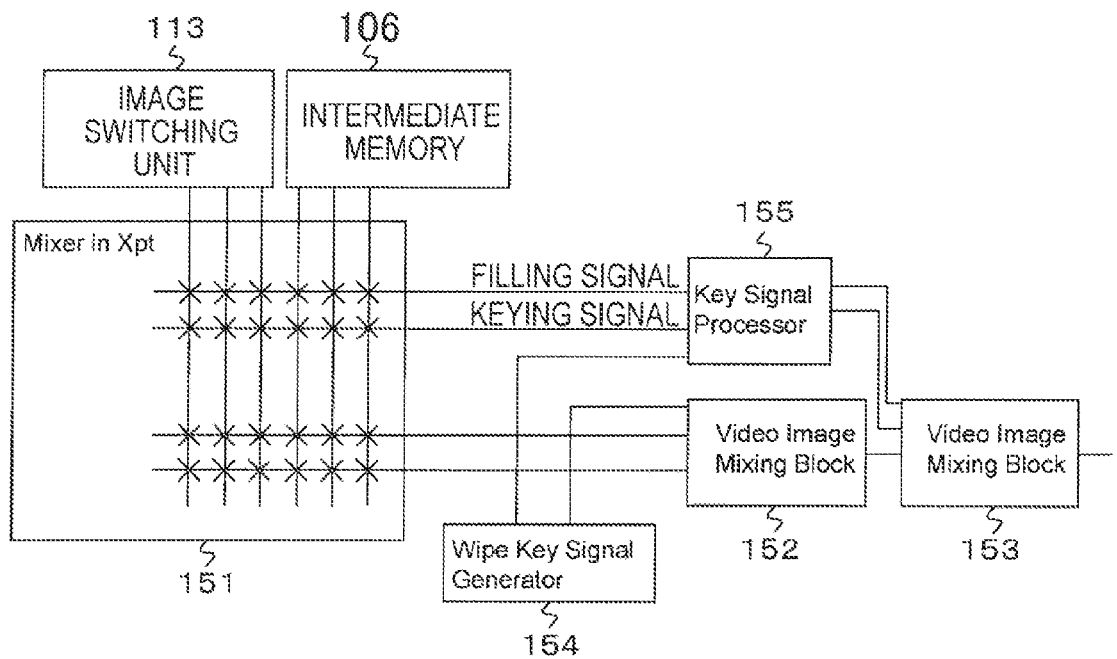
FIG. 6 is a diagram illustrating another configuration example of an image combining unit configuring an image processing apparatus.

FIG. 6 illustrates another configuration example of the image combining unit 114. In this configuration example, any input image can be keying-overlapped. In this configuration example, the image combining unit 114 includes a switching unit (Mixer in Xpt) 151, two combining units (Video Image Mixing Blocks) 152 and 153, a wipe key signal generator 154, and a key signal processor 155.

The switching unit 151 extracts a filling signal (first image data) and a keying signal (second image data) from the image data output from the image switching unit 113 and the image data output from the intermediate memory 106 and inputs the filling signal and the keying signal to the key signal processor 155. In this case, the filling signal and the keying signal may be generated by the GPU 104 and a keyer may be made to be shared by the GPU 104.

In addition, the switching unit 151 extracts the third image data and the fourth image data from the image data output from the image switching unit 113 and the image data output from the intermediate memory 106 and inputs the third and fourth image data to the combining unit 152. The wipe key signal generator 154 generates a wipe key signal to perform the image switching based on the wipe and supplies the wipe key signal to the combining unit 152 and the key signal processor 155. The combining unit 152 performs the transition of the image switching based on the wipe from the third image data to the fourth image data, on the basis of the wipe key signal.

The key signal processor 155 converts a keying signal into a key signal by brightness or executes a chroma key process with respect to the keying signal and generates a key signal showing an overlapped region/density. The key signal processor 155 can convert the wipe key signal generated by the wipe key signal generator 154 into a key signal. The key signal processor 155 executes a waveform process to make the filling signal becoming overlapped image data become desired overlapping according to the key signal. The combining unit 153 keying-overlaps the filling signal to the image data output from the combining unit 152, on the basis of the processed filling signal and the key signal output from the key signal processor 155.

[Description of Recall]

Next, a recall in the image processing apparatus 100 illustrated in FIG. 1 will be described. The image processing apparatus 100 has a function of collectively storing entire content of an image process of each unit in the memory and reading the content and restoring an image process state. A restoration operation is referred to as the "recall".

In the image processing apparatus 100, storage of the content of the image process of each unit is performed using an image process state memory to be an exclusively used memory area. The image process state memory has a plurality of areas to store a set of image process states and receives a manipulation to designate any area by a number and performs storage and restoration. In the first computer 101, an embedded non-volatile storage such as a hard disk is used to hold the content of the image process state memory even after the power supply is turned off.

In the image processing apparatus 100, the image process state memory includes a first image process state memory 101a that is provided in a memory attached to the first computer 101 and a second image process state memory 111a that is provided in a memory attached to the second computer 111. Each image process state memory stores control data regarding a portion managed by each computer.

Figure 7:
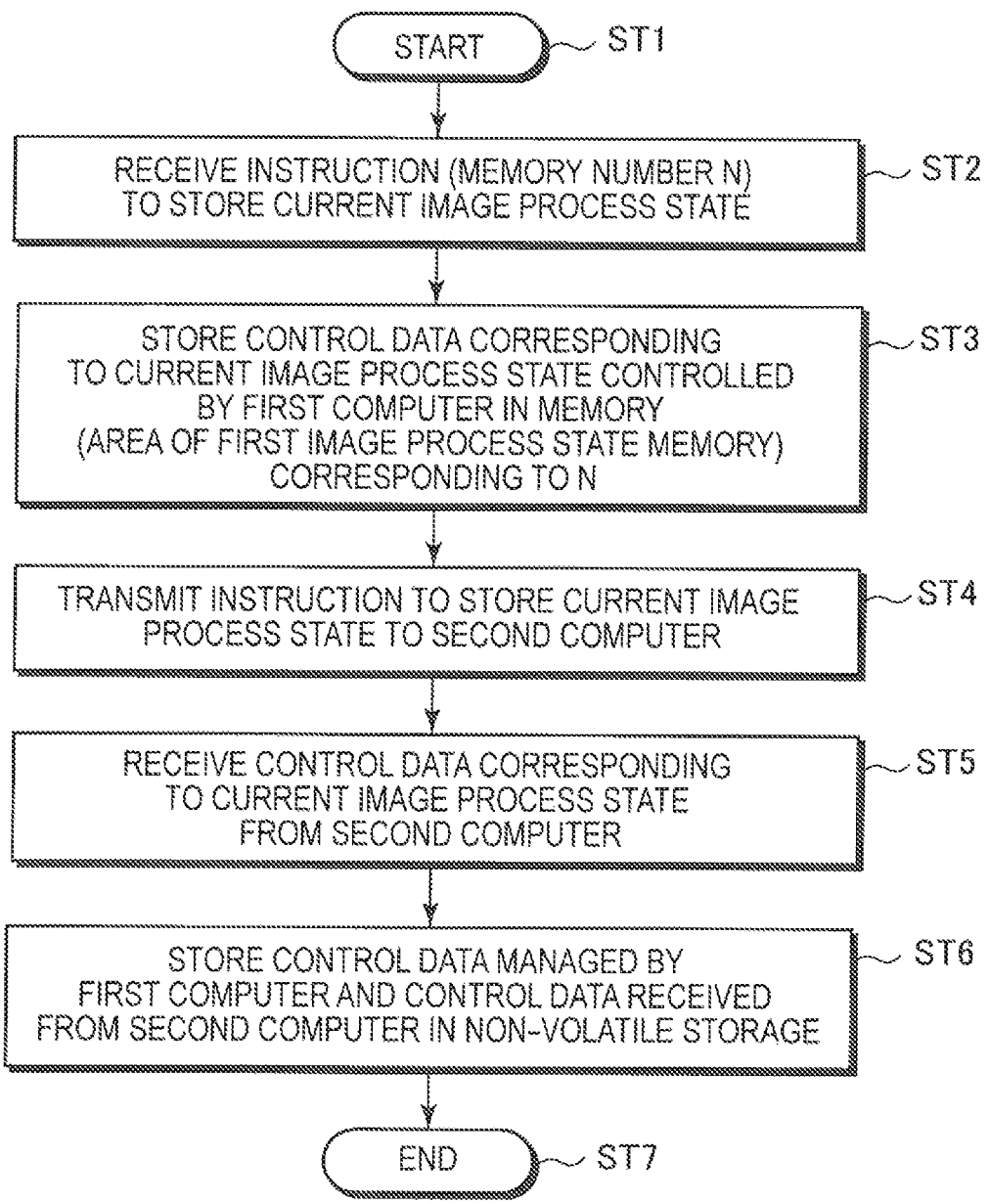
FIG. 7 is a flowchart illustrating an example of a process sequence at the time of storing with respect to an image process state memory in a first computer.

A flowchart of FIG. 7 illustrates an example of a process sequence at the time of storing with respect to the image process state memory in the first computer 101. In step ST1, the first computer 101 starts a process and proceeds to a process of step ST2. In step ST2, according to a manipulation to store a current image process state of a user in the user manipulation unit 102, the first computer 101 receives an instruction to store the current image process state from the user manipulation unit 102. The instruction includes a number (memory number N) to specify one image process state area of the image process state memory.

Next, in step ST3, the first computer 101 stores control data corresponding to the current image process state controlled by the first computer 101 in a memory (area of the first image process state memory 101*a*) corresponding to the memory number N. In step ST4, the first computer 101 transmits an instruction (including the memory number N) to store the current image process state to the second computer 111.

Next, in step ST5, the first computer 101 receives the control data corresponding to the current image process state from the second computer 111. In step ST6, the first computer 101 combines the control data managed by the first computer 101 and the control data received from the second computer 111, writes the control data to a non-volatile storage not illustrated in the drawings, and stores the control data. Then, in step ST7, the first computer 101 ends a series of processes.

Figure 8:
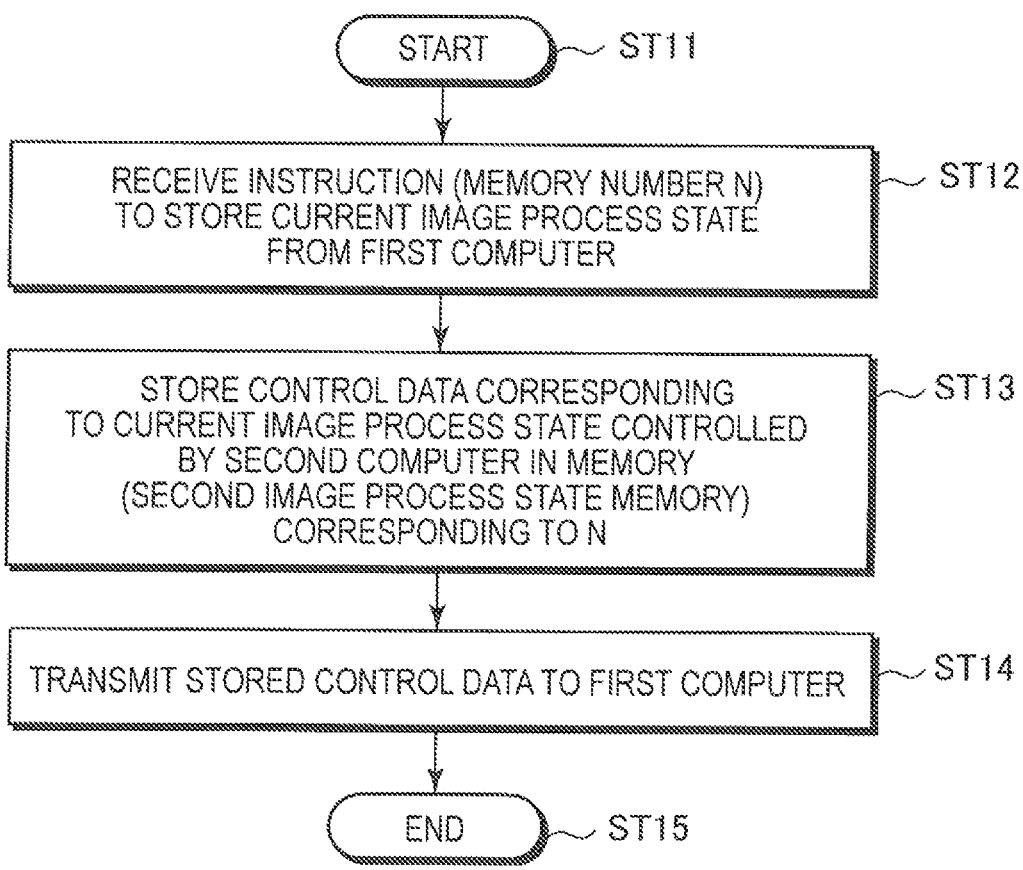
FIG. 8 is a flowchart illustrating an example of a process sequence at the time of storing with respect to an image process state memory in a second computer.

A flowchart of FIG. 8 illustrates an example of a process sequence at the time of storing with respect to the image process state memory in the second computer 111. In step ST11, the second computer 111 starts a process and proceeds to a process of step ST12. In step ST12, the second computer 111 receives an instruction (including the memory number N) to store the current image process state from the first computer 101.

Next, in step ST13, the second computer 111 stores control data corresponding to the current image process state controlled by the second computer 111 in a memory (area of the second image process state memory 111*a*) corresponding to the memory number N. In step ST14, the second computer 111 transmits the control data stored by step ST13 to the first computer 101. Then, in step ST15, the second computer 111 ends a series of processes.

Figure 9:
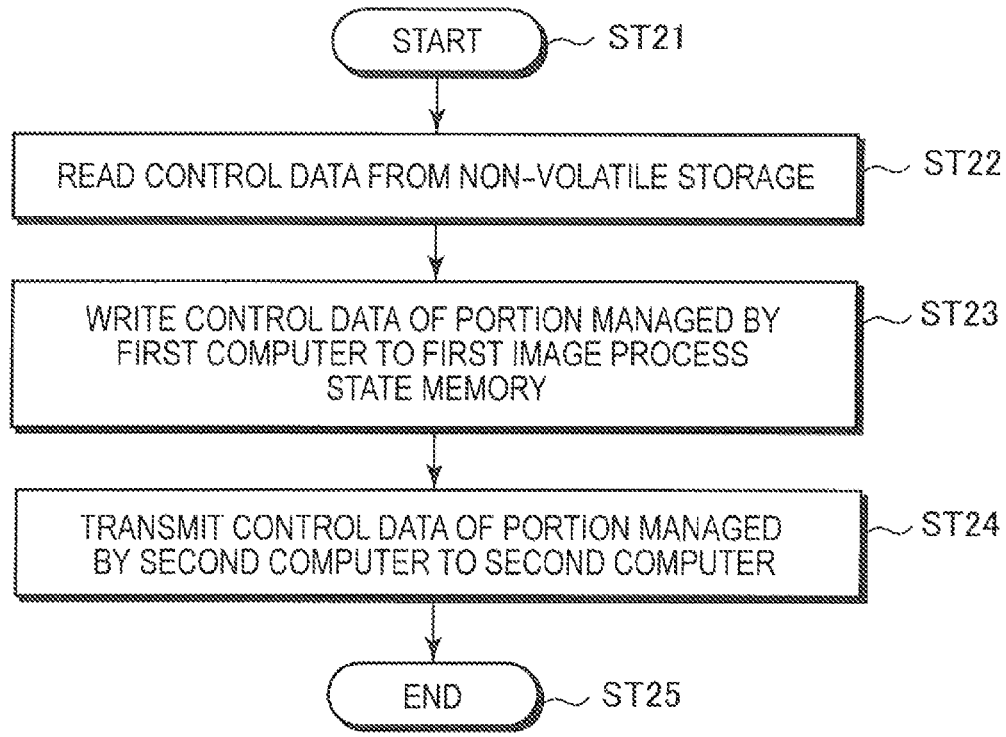
FIG. 9 is a flowchart illustrating an example of a process sequence of a content restoration of an image process state memory in a first computer when a power supply starts.

A flowchart of FIG. 9 illustrates an example of a process sequence at the time of restoring the content of the image process state memory 101*a* in the first computer 101 when the power supply starts. In step ST21, the first computer 101 starts a process and proceeds to a process of step ST22. In step ST22, the first computer 101 reads control data of each memory number to be stored, from the non-volatile storage.

Next, in step ST23, the first computer 101 stores control data of a portion managed by the first computer 101 in the first image process state memory 101*a*. In step ST24, the first computer 101 transmits control data of a portion managed by the second computer 111 to the second computer 111. Then, in step ST25, the first computer 101 ends a series of processes.

Figure 10:
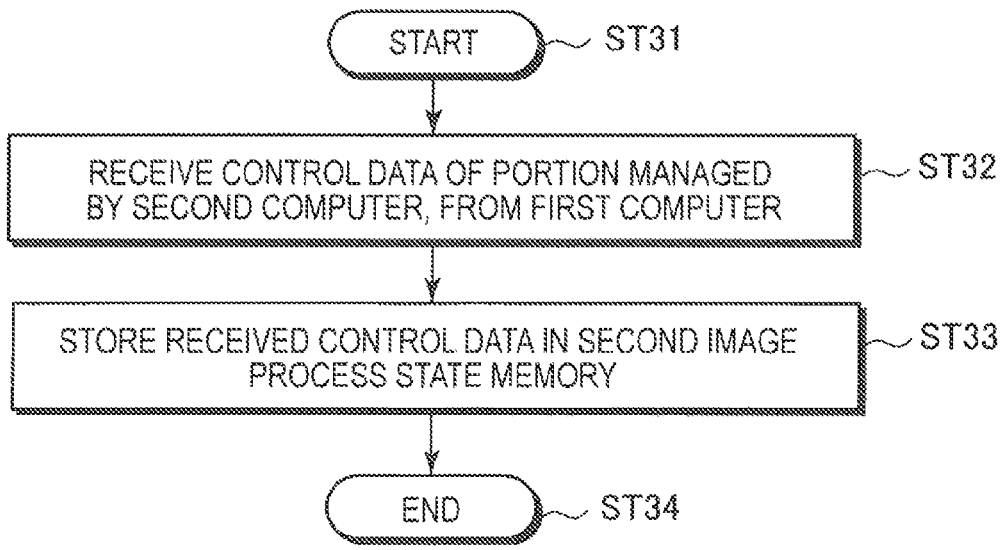
FIG. 10 is a flowchart illustrating an example of a process sequence of a content restoration of an image process state memory in a second computer when a power supply starts.

A flowchart of FIG. 10 illustrates an example of a process sequence at the time of restoring the content of the image process state memory 111*a* in the second computer 111 when the power supply starts. In step ST31, the second computer 111 starts a process and proceeds to a process of step ST32. In step ST32, the second computer 111 receives the control data of the portion managed by the second computer 111, from the first computer 101. In step ST33, the second computer 111 stores the received control data in the second image process state memory 111*a*. Then, in step ST24, the second computer 111 ends a series of processes.

Figure 11:
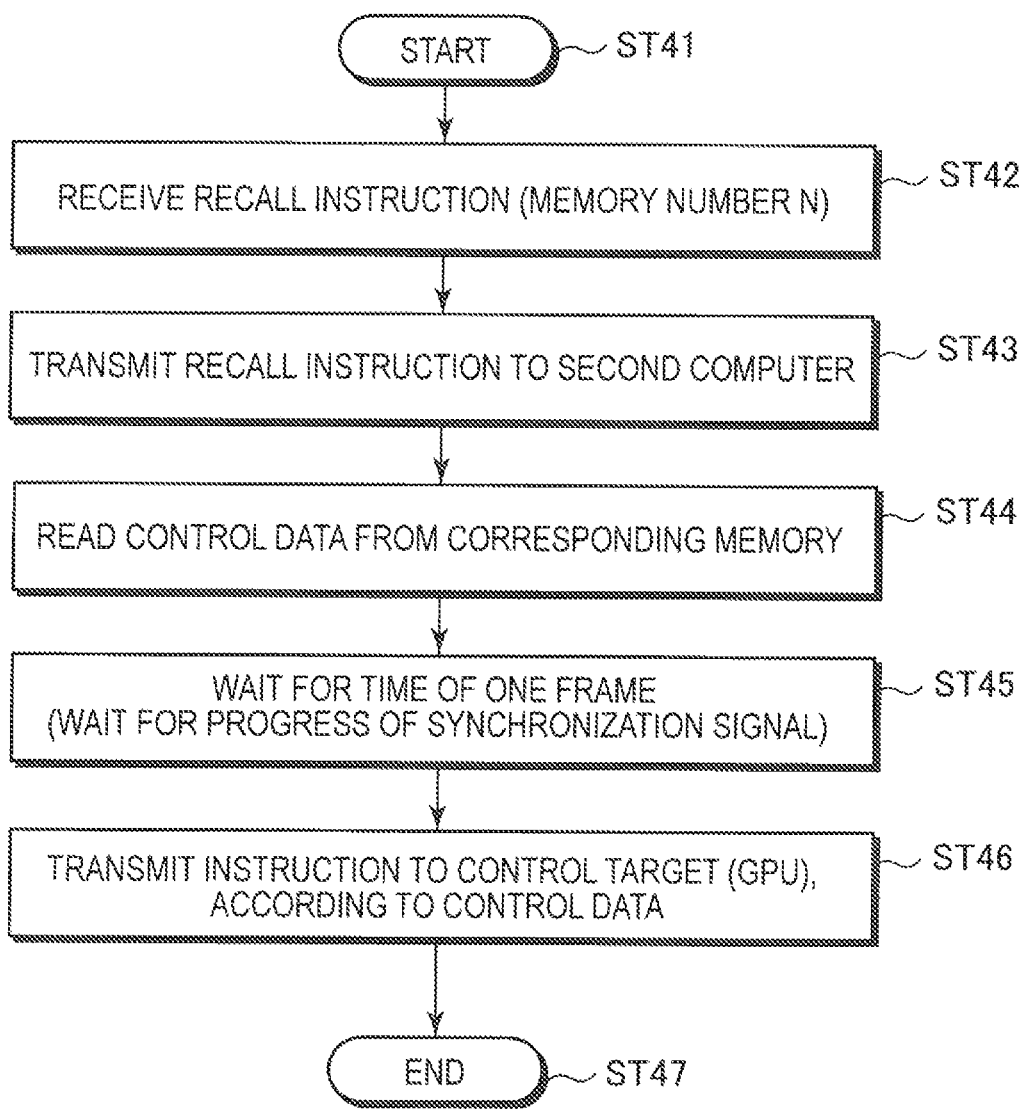
FIG. 11 is a flowchart illustrating an example of a process sequence at the time of recalling (restoring) of an image process state in a first computer.

A flowchart of FIG. 11 illustrates an example of a process sequence at the time of recalling (restoring) of the image process state in the first computer 101. In step ST41, the first computer 101 starts a process and proceeds to a process of step ST42.

In step ST42, the first computer 101 receives a recall instruction from the user manipulation unit 102, according to the recall manipulation of the user in the user manipulation unit 102. The recall instruction includes a number (memory number N) to specify one image process state area of the image process state memory. In step ST43, the first computer 101 transmits the recall instruction (including the memory number N) to the second computer 111.

Next, in step ST44, the first computer 101 reads control data from a memory (area of the first image process state memory 101*a*) corresponding to the memory number N of the first image process state memory 101*a*. In step ST45, the first computer 101 waits for a time of one frame, that is, waits for the progress of a synchronization signal. Then, in step ST46, the first computer 101 transmits an instruction to the GPU 104 to be a control target, according to the control data. Then, in step ST47, the first computer 101 ends a series of processes.

Figure 12:
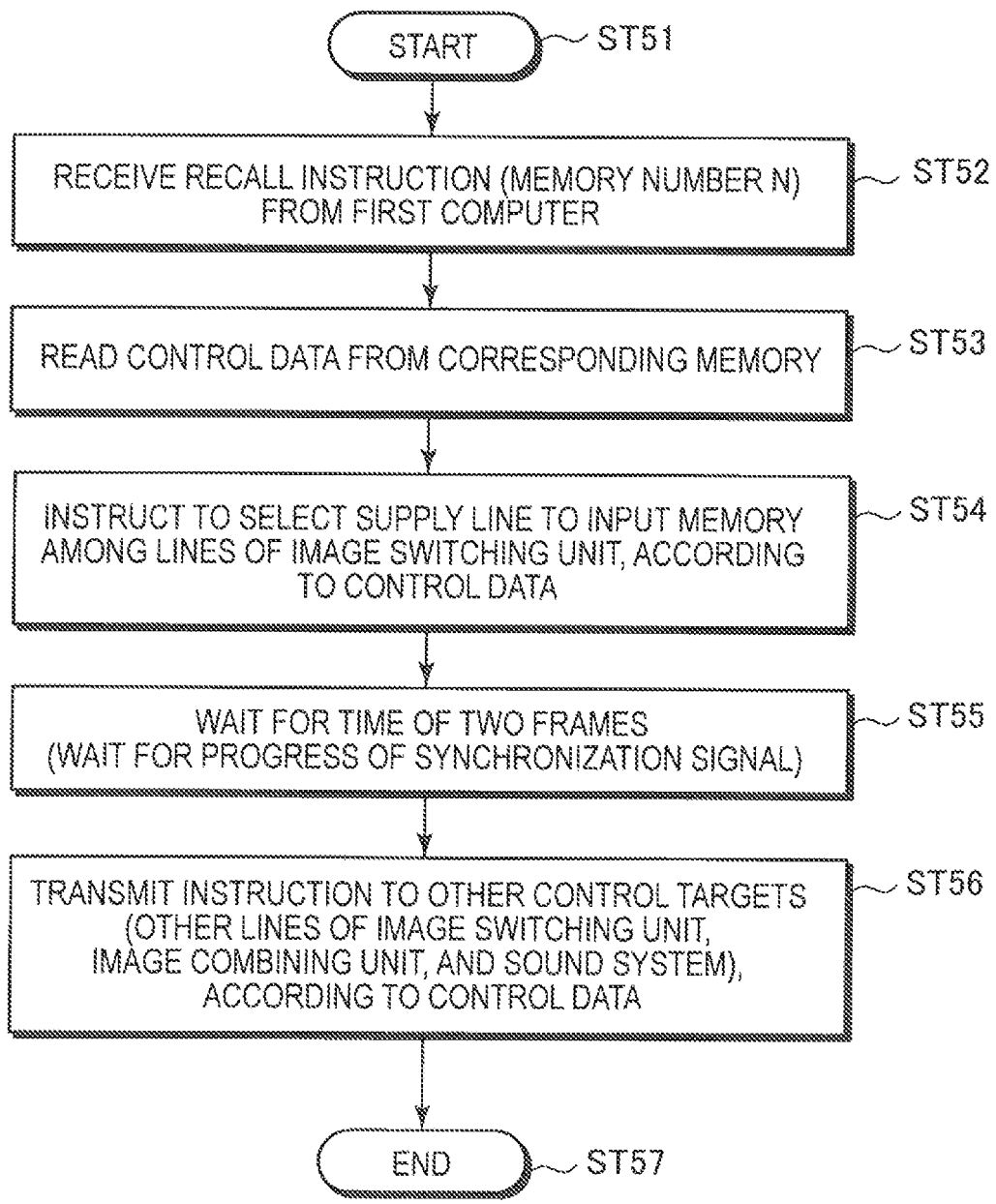
FIG. 12 is a flowchart illustrating an example of a process sequence at the time of recalling (restoring) of an image process state in a second computer.

A flowchart of FIG. 12 illustrates an example of a process sequence at the time of recalling (restoring) of the image process state in the second computer 111.

In step ST51, the second computer 111 starts a process and proceeds to a process of step ST52. In step ST52, the second computer 111 receives a recall instruction (including the memory number N) from the first computer 101.

Next, in step ST53, the second computer 111 reads control data from a memory (area of the second image process state memory 111*a*) corresponding to the memory number N of the second image process state memory 111*a*. In step ST54, the second computer 111 instructs to select a supply line to the input memory 105 among lines of the image switching unit 113, according to the control data.

Next, in step ST55, the second computer 111 waits for a time of two frames, that is, waits for the progress of a synchronization signal. In step ST56, the second computer 111 transmits an instruction to other control targets (other lines of the image switching unit 113, the image combing unit 114, and the sound system), according to the control data. Then, in step ST57, the second computer 111 ends a series of processes.

The recall (restoration) operation in the image processing apparatus 100 illustrated in FIG. 1 will be further described. In the recall operation, if a state of each unit is restored at one time (at a point of time of a certain image frame), a problem may occur. That is, a time of a plurality of frames is necessary until the CPU 104 reads the image data from the input memory 105 and writes the processed and generated image data to the intermediate memory 106.

Before the first GPU process according to the recall instruction ends, if the image data of the intermediate memory 106 to be written by the GPU 104 is used by the image switching unit 113 or the image combining unit 114, the image data processed by the GPU 104 is used in a state before the restoration. In this case, unjust output image data may be generated momentarily. In order to prevent the unjust output image data from being generated momentarily, the image processing apparatus 100 executes a series of operations illustrated in FIG. 13. An operation sequence progresses according to reception of a vertical synchronization signal used as operation timing by the image switching unit 113 and the image combining unit 114.

As described above, in the image processing apparatus 100 illustrated in FIG. 1, the image process state memory includes the first image process state memory 101*a* and the second image process state memory 111a. The first image process state memory 101a is provided in the memory attached to the first computer 101 and the second image process state memory 111a is provided in the memory attached to the second computer ill. The first image process state memory 101a and the second image process state memory 111a store state data regarding the portions managed by the individual computers.

Figure 13:
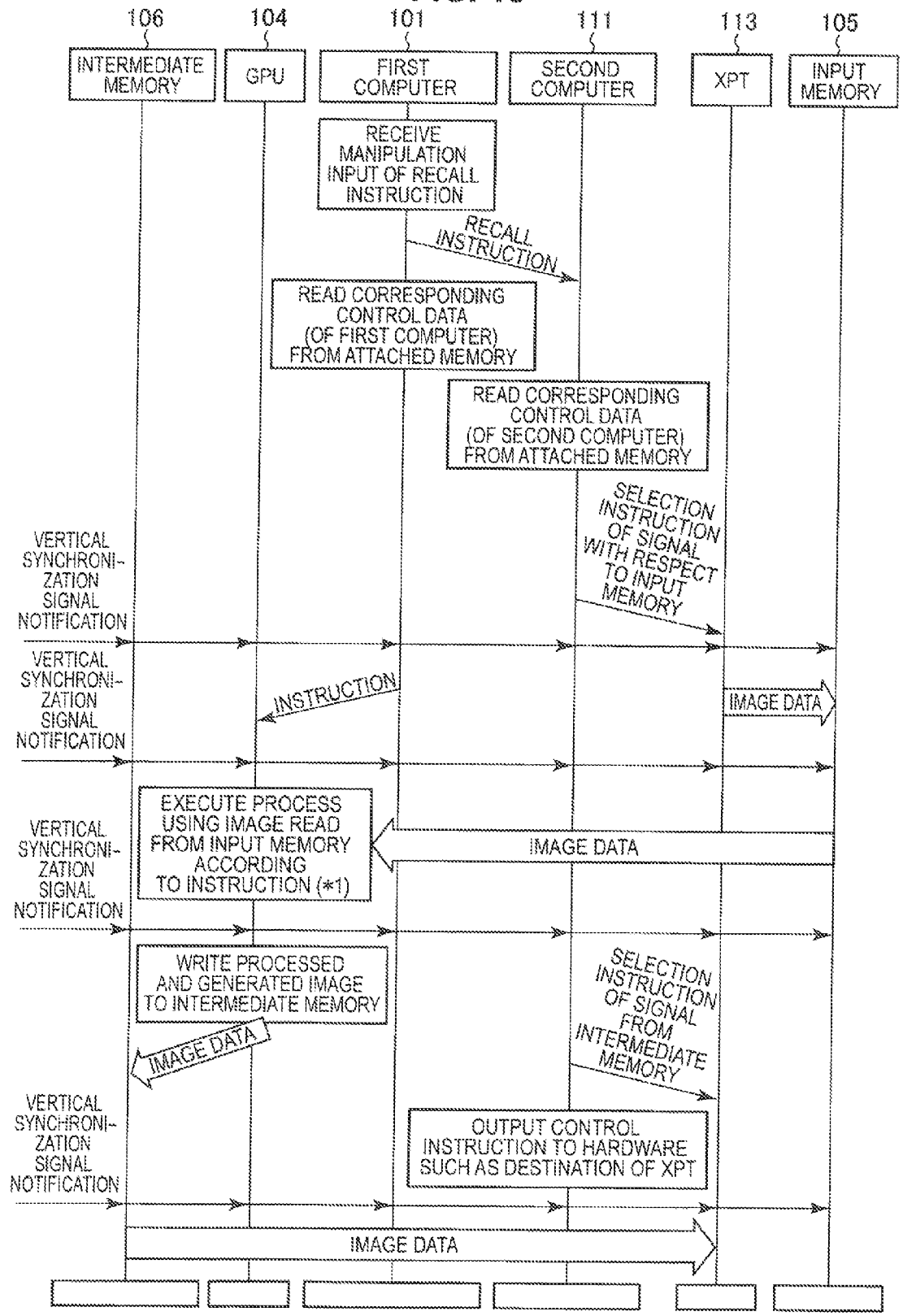
FIG. 13 is a sequence diagram illustrating an operation example at the time of recalling (restoring) of an image processing apparatus.

The operations illustrated in FIG. 13 will be sequentially described. According to the reception of the recall (restoration) instruction from the user manipulation unit 102 based on the user manipulation, the operation sequence starts. The recall instruction includes a number (memory number N) to specify one image process state (area) of the image process state memory. The first computer 101 transmits the recall instruction to the second computer.

The first computer 101 reads control data from a memory (area of the first image process state memory 101a) corresponding to the memory number N of the first image process state memory 101a. The second computer 111 reads control data from a memory (area of the second image process state memory 111a) corresponding to the memory number N of the second image process state memory 111a. The second computer 111 controls the image switching unit (XPT) 113 and causes the image switching unit 113 to select a signal supplied to the input memory 105.

The image switching unit 113 performs actual signal switching in synchronization with timing of a vertical synchronization signal. After the timing of the vertical synchronization signal, the first computer 101 transmits an instruction to the GPU 104 by the immediately previously read control data. The GPU 104 reads image data from the input memory 105 and processes the image data, according to the instruction, after the timing of the next vertical synchronization signal. If the process of the image data is changed in the middle of a frame/field, an abnormal image that is cut in the middle of a screen is generated. For this reason, the process is changed using the vertical synchronization signal as a break.

After the timing of the next vertical synchronization signal, the image data processed and generated by the GPU 104 is written to the intermediate memory 106. At the same time, the second computer 111 instructs the image switching unit 113 to select an image from the intermediate memory 106 and supply the image to the image combining unit 114. The image switching unit 113 performs switching according to the instruction at the timing of the next vertical synchronization signal.

The second computer 111 transmits a control signal of a process state restoration to the image combining unit 114 at the same timing. After the image switching unit 113 is switched, the image is supplied from the intermediate memory 106 to the image combining unit 114 and a designated image process (combining) is executed by the image combining unit 114. After the series of operations, the GPU 104 and the image combining unit 114 continuously executes a process with respect to the image frame input to the image processing apparatus 100.

Figure 14:
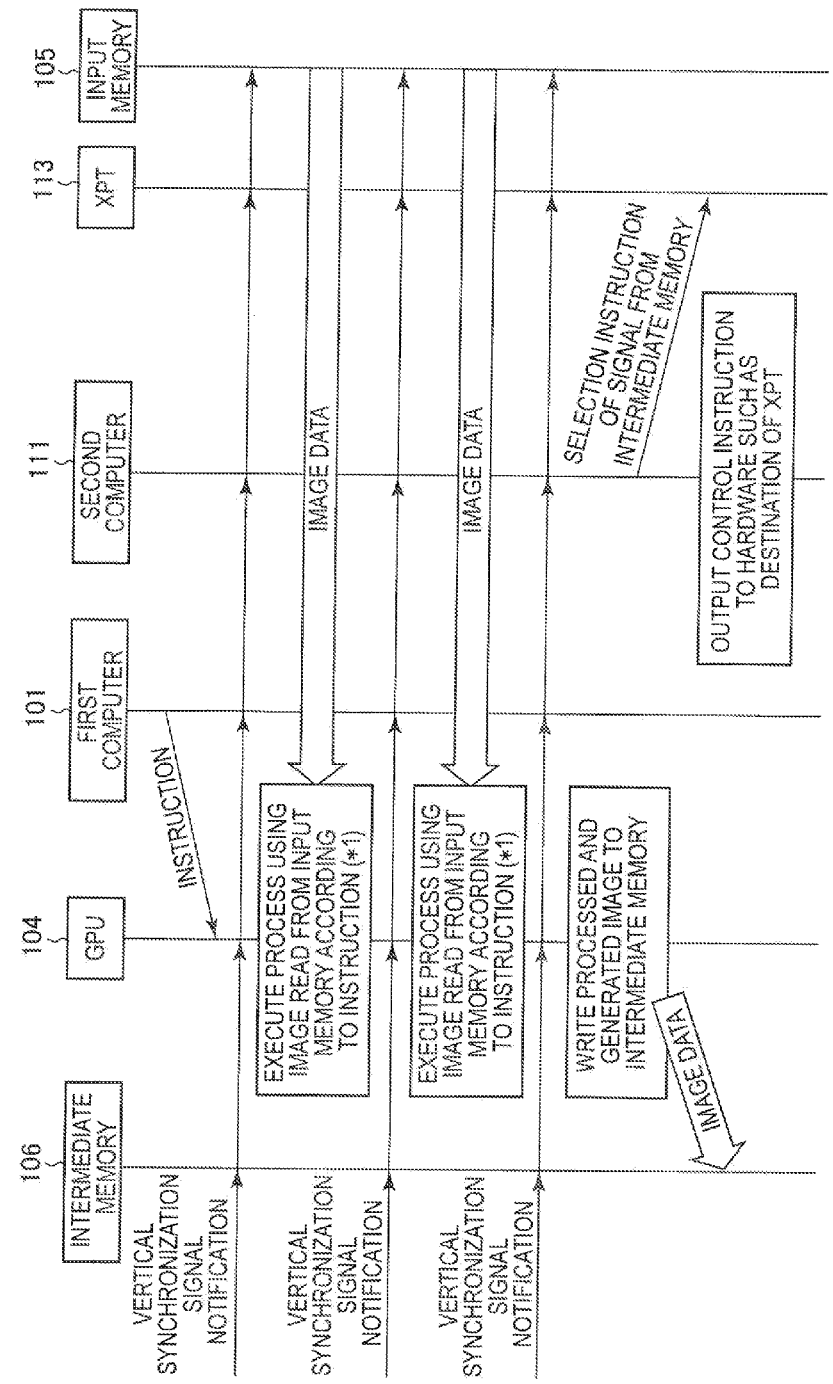
FIG. 14 is a sequence diagram illustrating another operation example at the time of recalling (restoring) of an image processing apparatus.

In the examples described above, the image process of the GPU 104 is executed in a time corresponding to one of the intervals of the vertical synchronization signals. However, when the image process of the GPU 104 is executed in a time corresponding to the two intervals, a portion of "*1" of FIG. 13 becomes a process illustrated in FIG. 14, using the vertical synchronization signal interval one more. A read operation of the image data by the GPU 104 illustrated in the portion of "*1" of FIG. 13 is executed continuously for every subsequent vertical synchronization signal.

Figure 15:
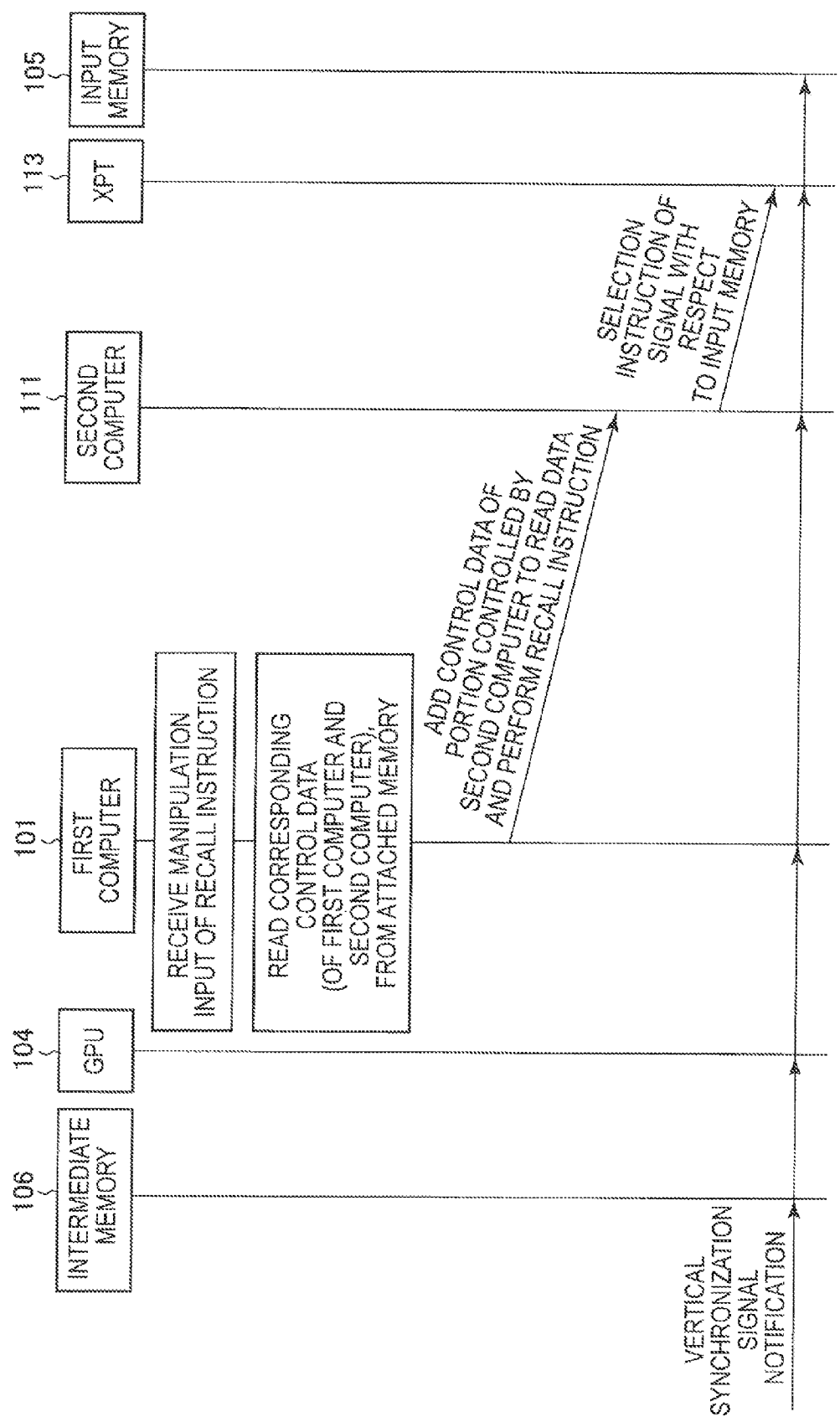
FIG. 15 is a sequence diagram illustrating another operation example at the time of recalling (restoring) of an image processing apparatus.

As another configuration, the case in which the image process state memory is composed of only the image process state memory 101a provided in the memory attached to the first computer 101 is considered. In this case, the control data regarding the portion managed by the second computer 111 is also included in the image process state memory 101a and the control data is transmitted from the first computer 101 to the second computer 111 and is used. In this case, a portion of the beginning of the sequence becomes a process illustrated in FIG. 15.

That is, when the first computer 101 receives a manipulation input (including the memory number N) of the recall (restoration) instruction, the first computer 101 reads the control data of the portion managed by the first computer 101 and the control data of the portion managed by the second computer 111, from a memory (area of the first image process state memory 101a) corresponding to the memory number N of the image process state memory 101a. In addition, the first computer 101 adds the recall instruction to the control data of the portion managed by the second computer 111 and transmits the control data to the second computer 111.

In contrast, the case in which the image process state memory is composed of only the image process state memory 111a provided in the memory attached to the second computer ill is considered. In this case, the control data regarding the portion managed by the first computer 101 is also included in the image process state memory 111a and the control data is transmitted from the second computer 111 to the first computer 101 and is used.

In this case, when the first computer 101 receives a manipulation input (including the memory number N) of the recall (restoration) instruction, the first computer 101 transmits the recall instruction to the second computer 111. The second computer 111 reads the control data of the portion managed by the second computer 111 and the control data of the portion managed by the first computer 101, from a memory (area of the second image process state memory 111a) corresponding to the memory number N of the image process state memory 111a. In addition, the second computer 111 transmits the control data of the portion managed by the first computer 101 to the first computer 101.

Figure 16:
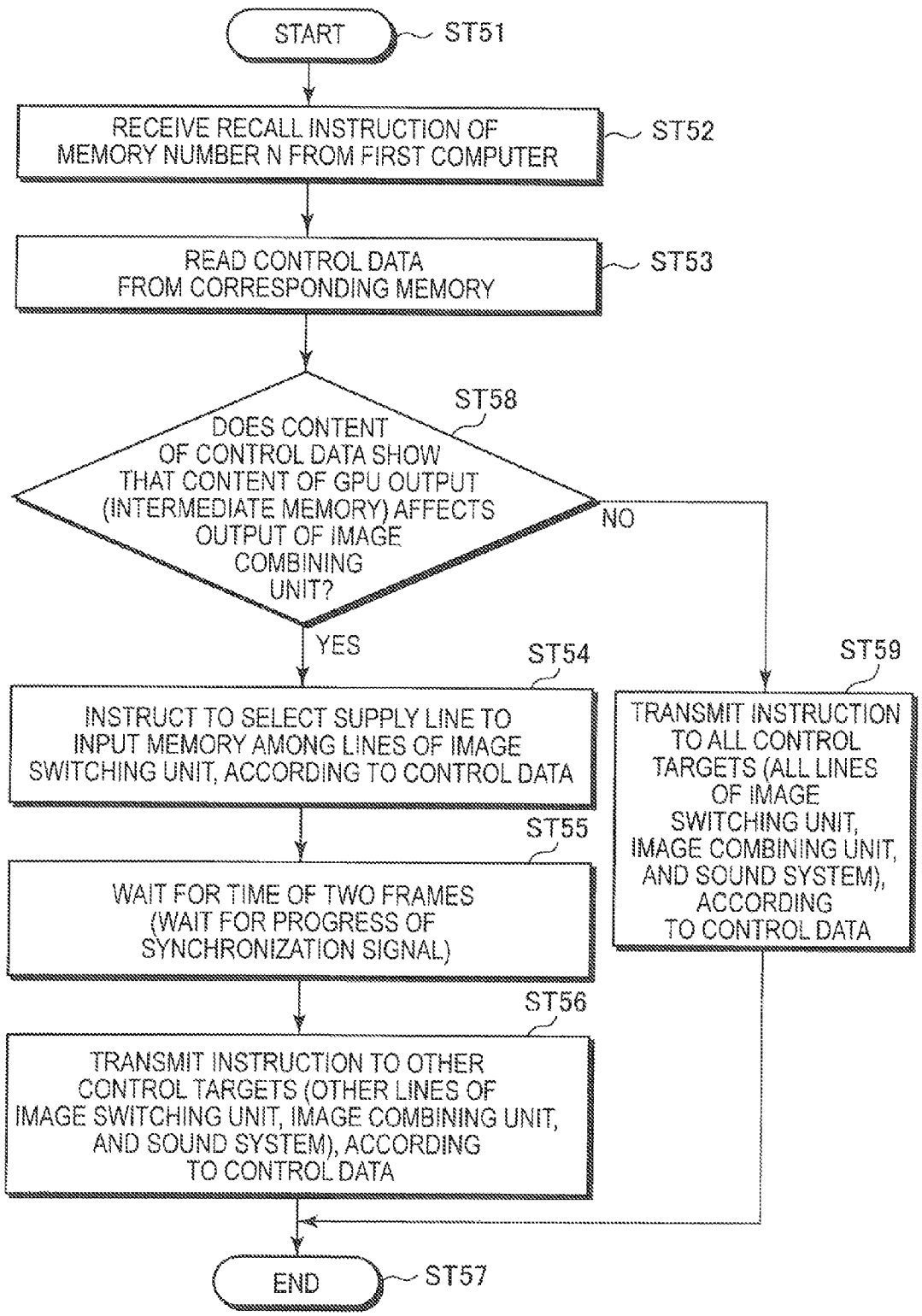
FIG. 16 is a flowchart illustrating another example of a process sequence at the time of restoring of an image process state in a second computer.

A flowchart of FIG. 16 illustrates another example of a process sequence at the time of restoring of the image process state in the second computer 111. In FIG. 16, steps corresponding to the steps of FIG. 12 are denoted with the same reference numerals and repeated explanation of these steps is omitted. In the flowchart of FIG. 16, step ST58 is added as a determination step after step STS53. In step ST58, the second computer 111 determines content of the read control data.

In this case, it is determined whether the content of the control data shows that content of an output of the GPU 104 (output of the intermediate memory 106) affects an output of the image combining unit 114. For example, in this case, it is determined whether the image switching unit 113 supplies the image data read from the intermediate memory 106 to the image combining unit 114. When the image switching unit 113 supplies the image data, the second computer 111 determines that the content of the output of the GPU 104 affects the output of the image combining unit 114 and proceeds to a process of step ST54, similar to the flowchart of FIG. 12.

Meanwhile, when the image switching unit 113 does not supply the image data, the second computer 111 determines that the content of the output of the GPU 104 does not affect the output of the image combining unit 114 and proceeds to a process of step ST59 immediately without waiting for the time of the two frames. In step ST59, the second computer 111 transmits an instruction to all the control targets (all lines of the image switching unit 113, the image combining unit 114, and the sound system), according to the control data. Then, the second computer 111 ends the process in step ST57.

Although detailed description is omitted, the other portions of the flowchart of FIG. 16 are the same as those of the flowchart of FIG. 12. As such, the determination step of step ST58 is added. Thereby, when the image data generated by the GPU 104 is not used by the image combining unit 114, the state of the output image can be restored immediately without waiting for the time of the two frames and a response to a manipulation becomes fast.

Figure 17:
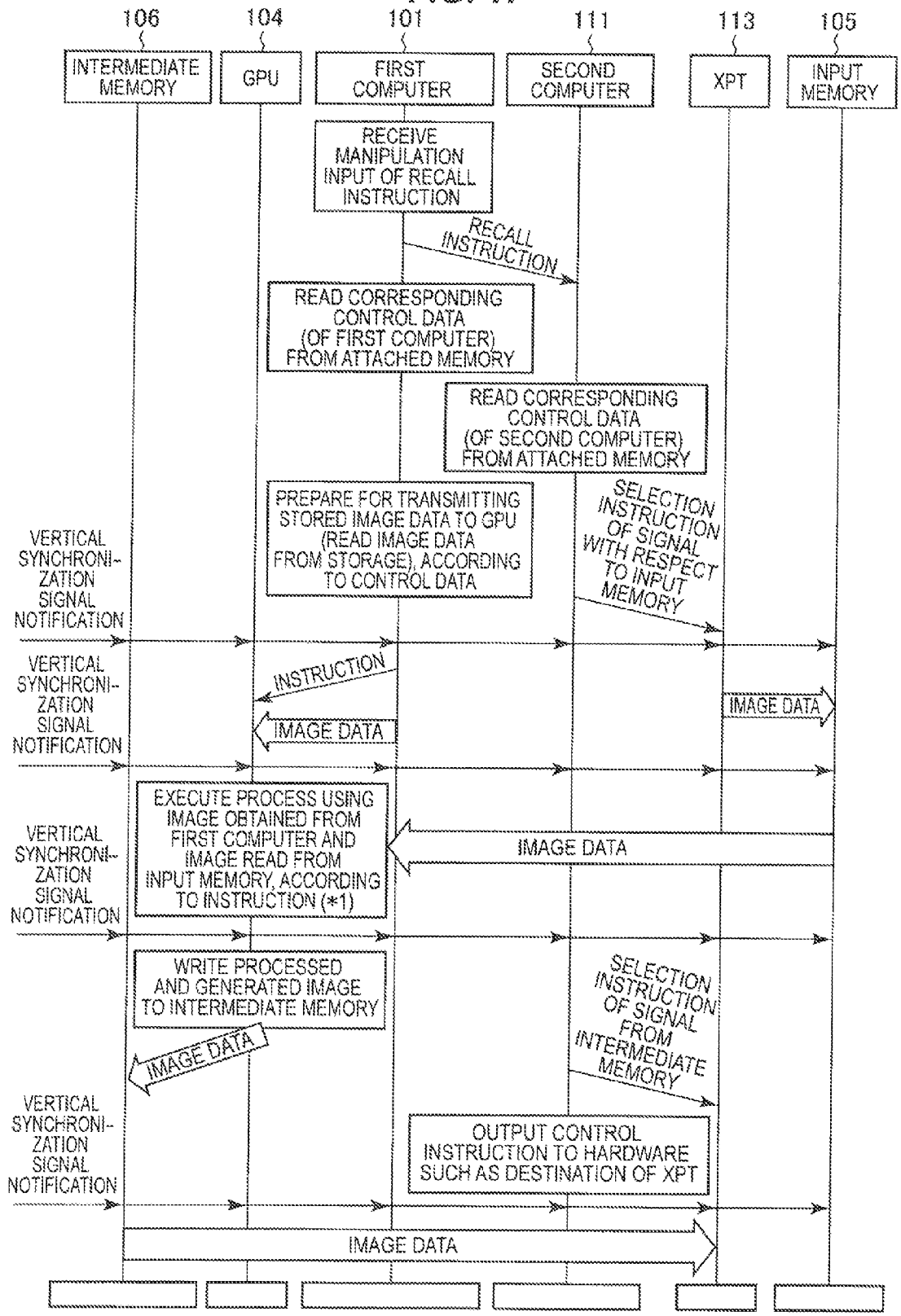
FIG. 17 is a sequence diagram illustrating another operation example at the time of recalling (restoring) of an image processing apparatus.

A sequence diagram of FIG. 17 illustrates another operation example. In this example, the GPU 104 executes a generation process of image data using the image data transmitted from the first computer 101. The first computer 101 investigates the read control data and investigates whether the image data held in the storage by the first computer 101 is used by the GPU 104. When the image data is used by the GPU 104, the first computer 101 reads the corresponding image data from the storage and transmits the image data to the GPU 104. As a specific example of this operation, the corresponding image data is stored in the memory that can accessed from the CPU 104, by a PCIe (PCI Express) bus.

As a result, a process using the image data stored by the first computer 101 by the GPU 104 can be restored. In addition, a situation where the generation process of the image data of the GPU 104 becomes active before becoming able to access the image data and unjust image data is generated can be prevented. By content of the image process, the image data held by the first computer 101 can be written to the intermediate memory 106 as it is and can be used as the frame of the video signal by the image combining unit 114.

When the image data is written to the intermediate memory 106, a format of the image data is limited to a predetermined format, such that the intermediate memory 106 securely executes an output process of the image data. For example, the format of the image data is limited by a function of the intermediate memory 106, like JPEG image data or non-compressed RGB data. For this reason, it is effective to previously convert a format of image data scheduled to be transmitted to the intermediate memory 106 into an appropriate format and hold the image data in the storage of the first computer 101. In the sequence diagram illustrated in FIG. 17, because a time until the image data is written to the intermediate memory 106 is determined, it is preferable to previously perform format conversion in time for the process.

As described above, in the image processing apparatus 100 illustrated in FIG. 1, each of a system of the GPU 104 and a main line system such as the image switching unit 113 or the image combining unit 114 is controlled independently by a separate computer. In the image combining unit 114, the image data generated by the GPU 104 as well as the input image data input to the image input unit 112 can be used through the intermediate memory 106. For this reason, an image process rich in extensibility is enabled and an image process of a stabilized operation with small delay is maintained.

In the image processing apparatus 100 illustrated in FIG. 1, when the recall (restoration) is instructed, the first computer 101 performs control to change the image process state of the GPU 104, on the basis of the corresponding control data. At this time, the second computer 111 performs control with respect to the image switching unit 113 and the image combining unit 114, on the basis of the corresponding control data, in synchronization with the change of the image process state of the GPU 104. For this reason, an unjust output image can be suppressed from being generated at the time of the recall (restoration).

2. Modification

In the image processing apparatus 100 illustrated in FIG. 1, one or more image data selected by the image switching unit 113 among the plurality of image data output from the image input unit 112 is written to the input memory 105. In the image processing apparatus 100 illustrated in FIG. 1, the image data read from the intermediate memory 106 is input to the image combining unit 114 through the image switching unit 113. However, the arrangement of the input memory 105 and the intermediate memory 106 is not limited to the arrangement in the image processing apparatus 100 illustrated in FIG. 1.

Figure 18:
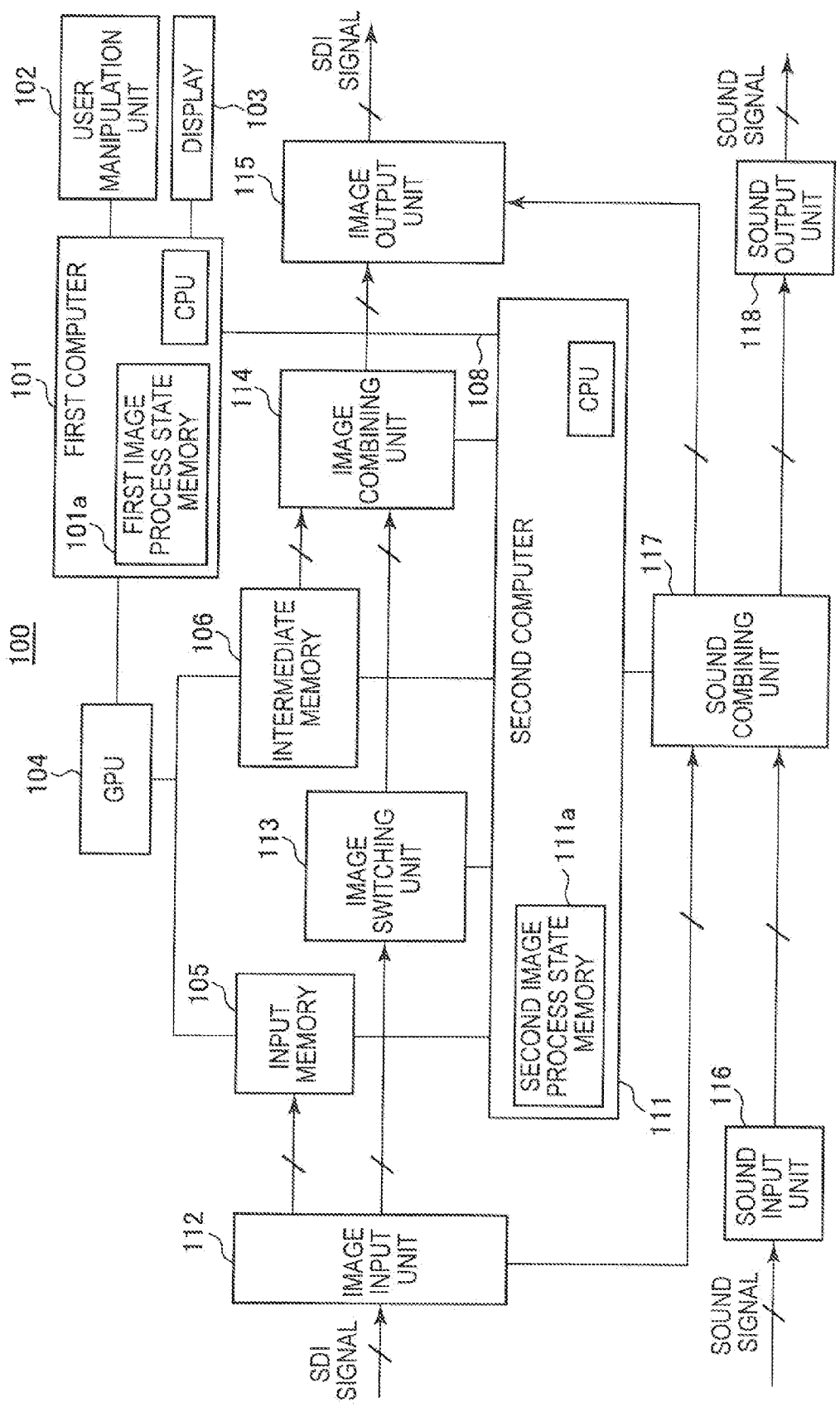
FIG. 18 is a block diagram illustrating another configuration example of an image processing apparatus.

FIG. 18 illustrates another example of the arrangement of the input memory 105 and the intermediate memory 106. In FIG. 18, structural elements corresponding to the structural elements in FIG. 1 are denoted with the same reference numerals. In this example, the plurality of image data output from the image input unit 112 are written to the input memory 105. The image data read from the intermediate memory 106 is input directly to the image combining unit 114.

Figure 19:
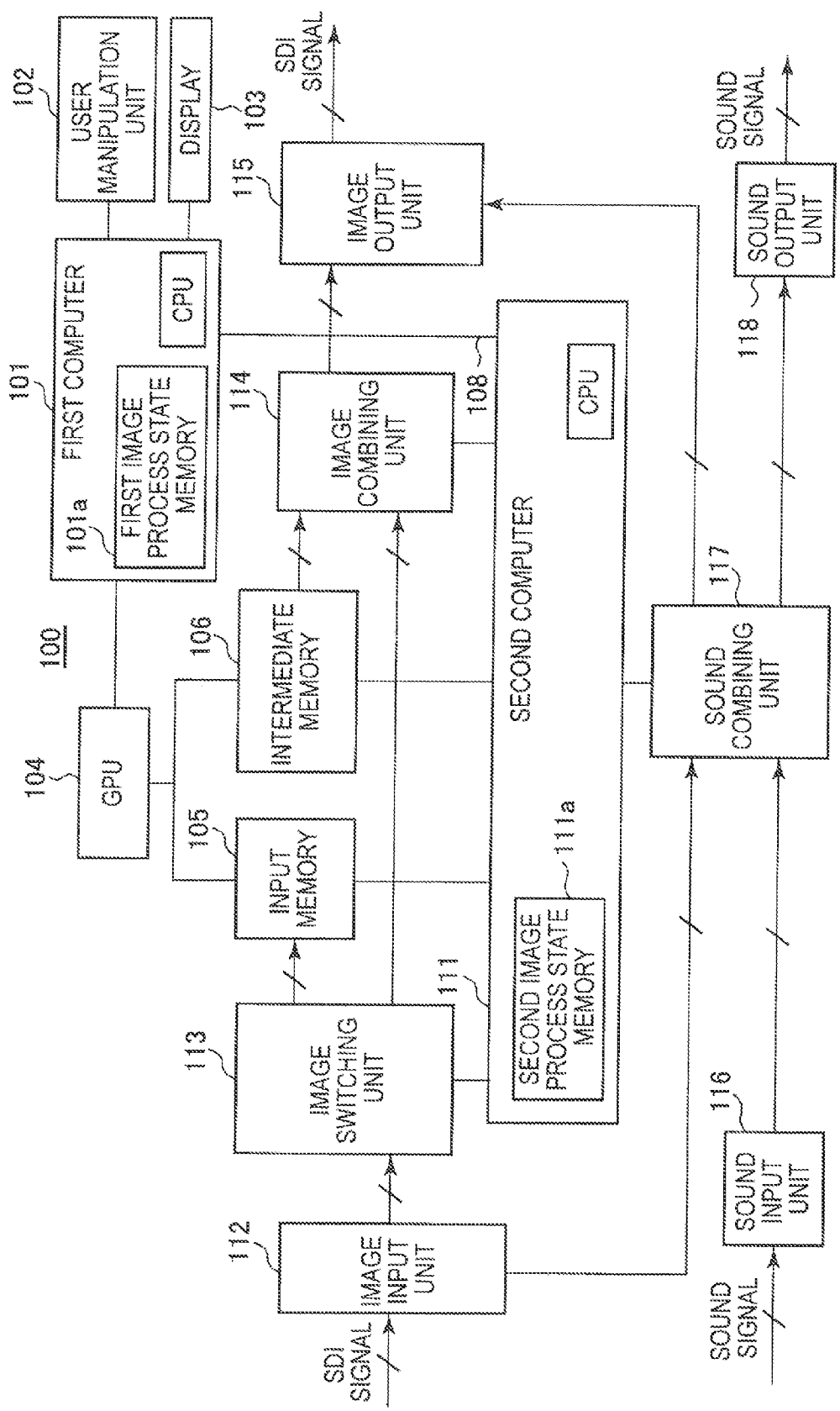
FIG. 19 is a block diagram illustrating another configuration example of an image processing apparatus.

FIG. 19 illustrates another example of the arrangement of the input memory 105 and the intermediate memory 106. In FIG. 19, structural elements corresponding to the structural elements in FIG. 1 are denoted with the same reference numerals. In this example, one or more image data selected by the image switching unit 113 are written to the input memory 105. The image data read from the intermediate memory 106 is input directly to the image combining unit 114.

Figure 20:
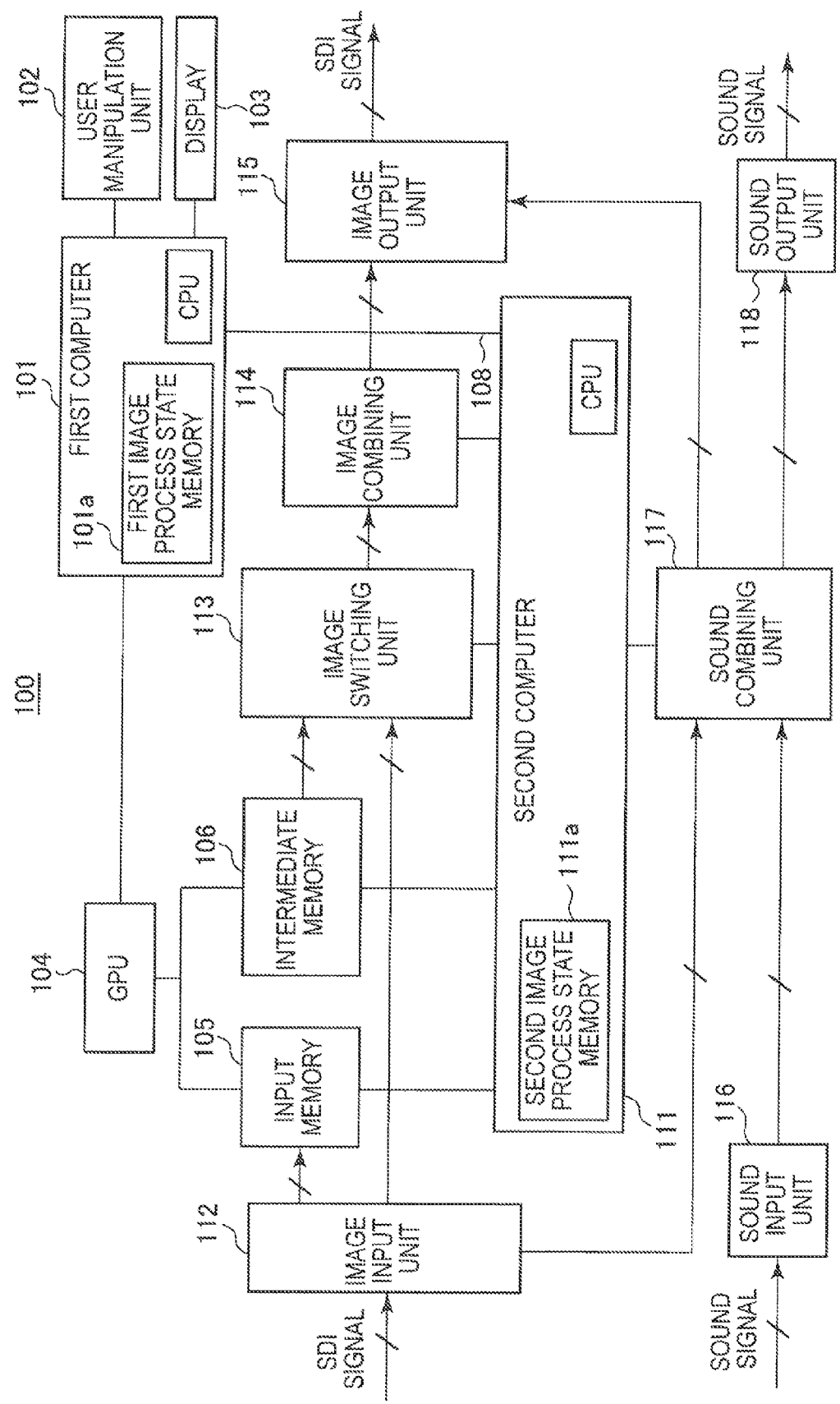
FIG. 20 is a block diagram illustrating another configuration example of an image processing apparatus.

FIG. 20 illustrates another example of the arrangement of the input memory 105 and the intermediate memory 106. In FIG. 20, structural elements corresponding to the structural elements in FIG. 1 are denoted with the same reference numerals. In this example, the plurality of image data output from the image input unit 112 are written to the input memory 105. The image data read from the intermediate memory 106 is input to the image combining unit 114 through the image switching unit 113.

Figure 21:
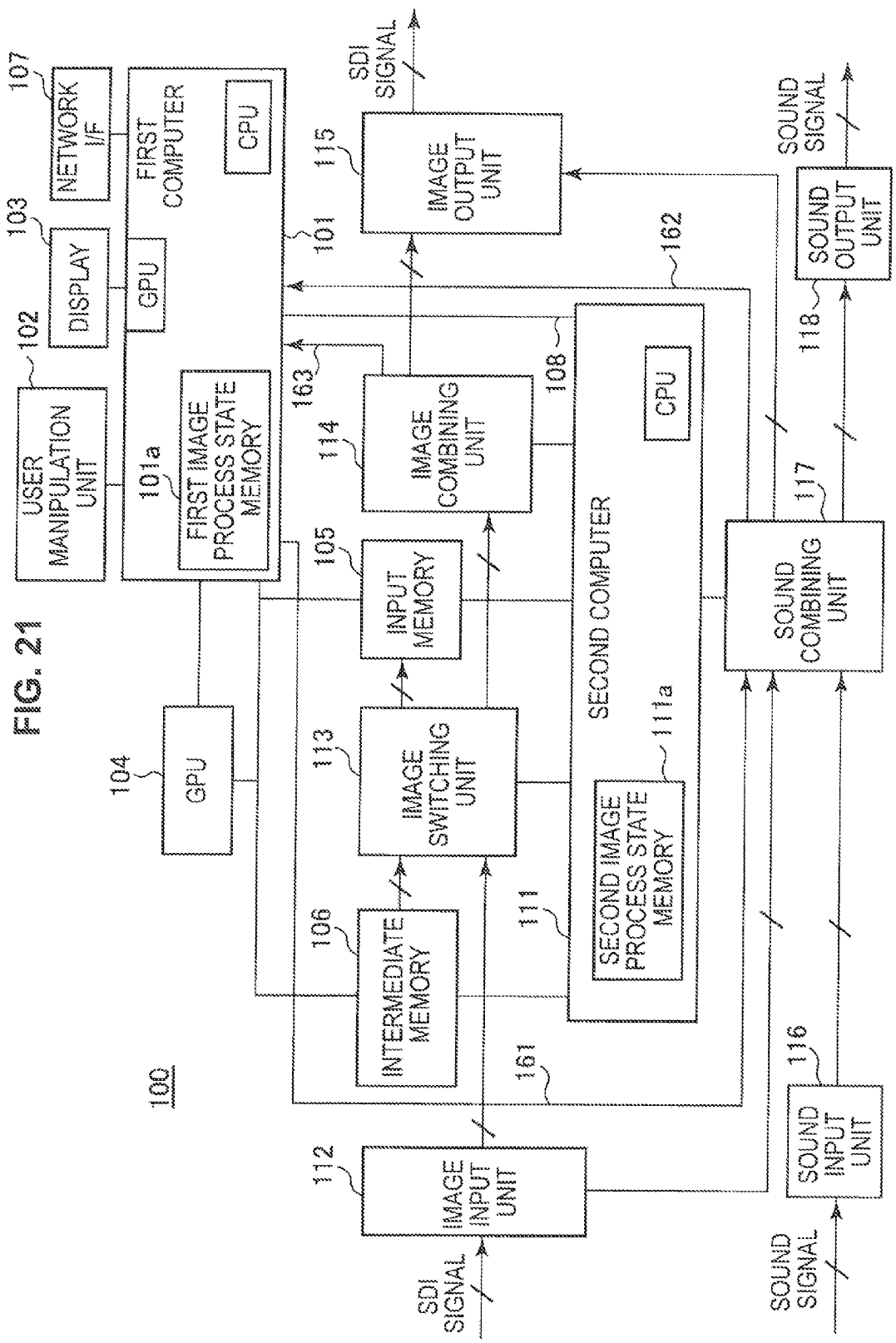
FIG. 21 is a block diagram illustrating another configuration example of an image processing apparatus.

FIG. 21 illustrates a modification of the image processing apparatus 100. In FIG. 21, structural elements corresponding to the structural elements in FIG. 1 are denoted with the same reference numerals and repeated explanation of these structural elements is omitted. In this example, in the first computer 101, a file including a moving image and a sound is reproduced and a path 161 to transmit sound data to the sound combining unit 117 is provided. In addition, a path 162 to transmit the sound data output from the sound combining unit 117 to the first computer 101 is provided.

In addition, a path 163 to transmit the image data output from the image combining unit 114 to the first computer 101 is provided. That is, the path 163 configures an output capture unit that captures the image data combined by the image combing unit 114 and supplies the image data to the first computer 101. In detail, the path 163 passes through a circuit illustrated in FIG. 22 or 23 to be described below. The image data reproduced by the first computer 101 is transmitted to the intermediate memory 106 for every frame, so that the image data can be included in an input of the image combining unit 114 through the image switching unit 113. The first computer 101 can transmit streaming data obtained by encoding the moving image and the sound to the network interface 107.

Figure 22:
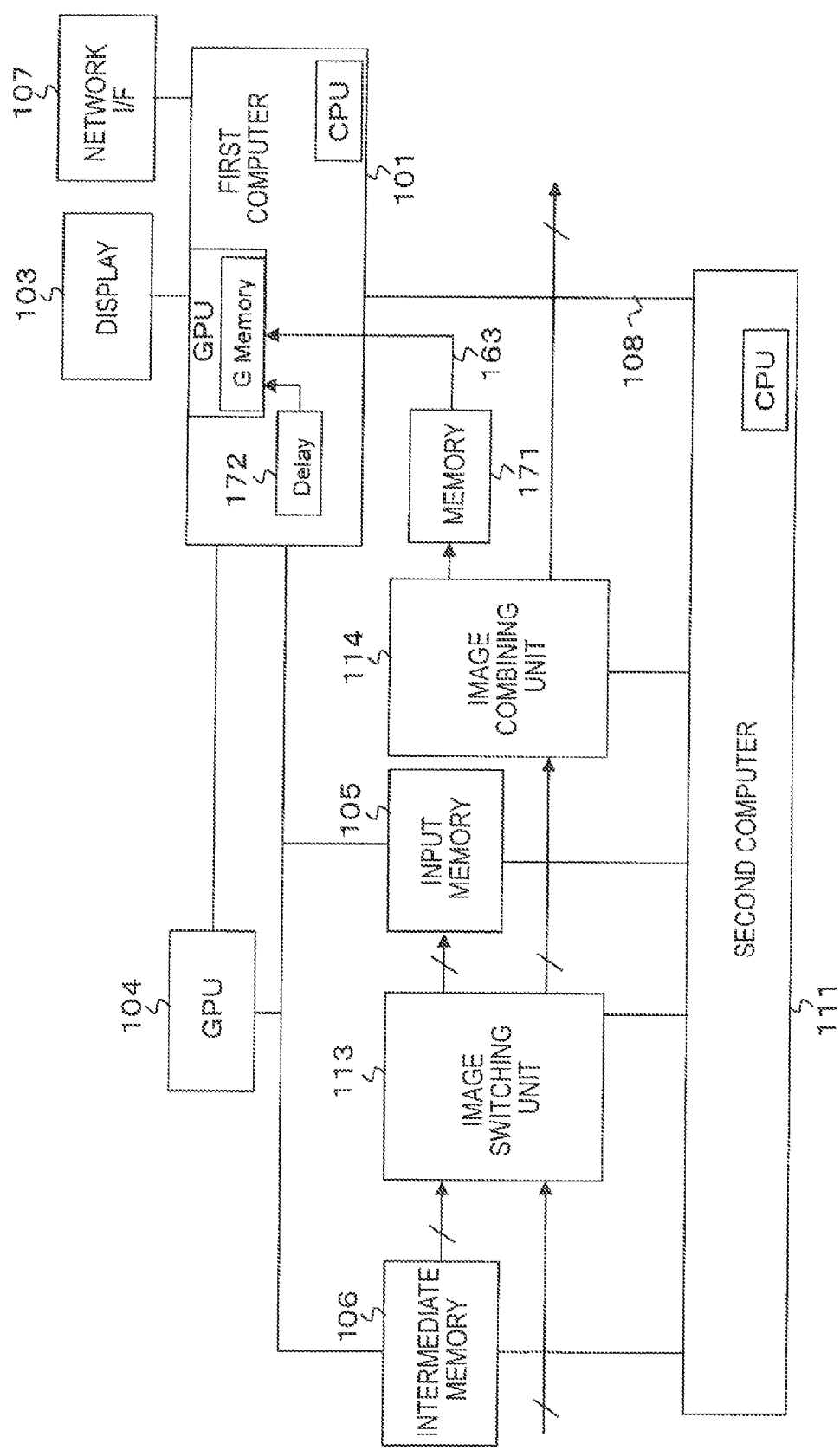
FIG. 22 is a diagram illustrating an example of a path to transmit image data output from an image combining unit to a first computer.

In FIG. 22, the memory 171 configures an output capture unit. Similar to the input memory 105, the memory 171 can writes the image data output from the image combining unit 114 to an embedded memory and can read the image data from the first computer 101. The first computer 101 can use the image data read from the memory 171 to distribute streaming or use the image data to display an image on the attached display 103. When the image is displayed on the display 103, the first computer 101 supplies the image data to a GPU for display.

In FIG. 22, a delay 172 that is provided in the first computer 101 is used to perform time adjustment with respect to the image data read from the input memory 105 or the intermediate memory 106. That is, when the image based on the image data from the memory 171 is displayed on a part of the display 103 and the image based on the image data read from the input memory 105 or the intermediate memory 106 is displayed on a part of the display 103, the time adjustment is performed with respect to the image data read from the input memory 105 or the intermediate memory 106.

Here, when the image based on the image data stored in the input memory 105 is displayed on the display 103, the first computer 101 reads the image data from the input memory 105 and transmits the image data to the embedded memory (not illustrated in the drawings). The first computer 101 performs the predetermined delay with respect to the image data transmitted as described above by the delay 172, performs the time adjustment, and performs image display.

When the image based on the image data stored in the intermediate memory 106 is displayed on the display 103, the first computer 101 reads the image data from the intermediate memory 106 and transmits the image data to the embedded memory (not illustrated in the drawings). The first computer 101 performs the predetermined delay with respect to the image data transmitted as described above by the delay 172, performs the time adjustment, and performs the image display.

Figure 23:
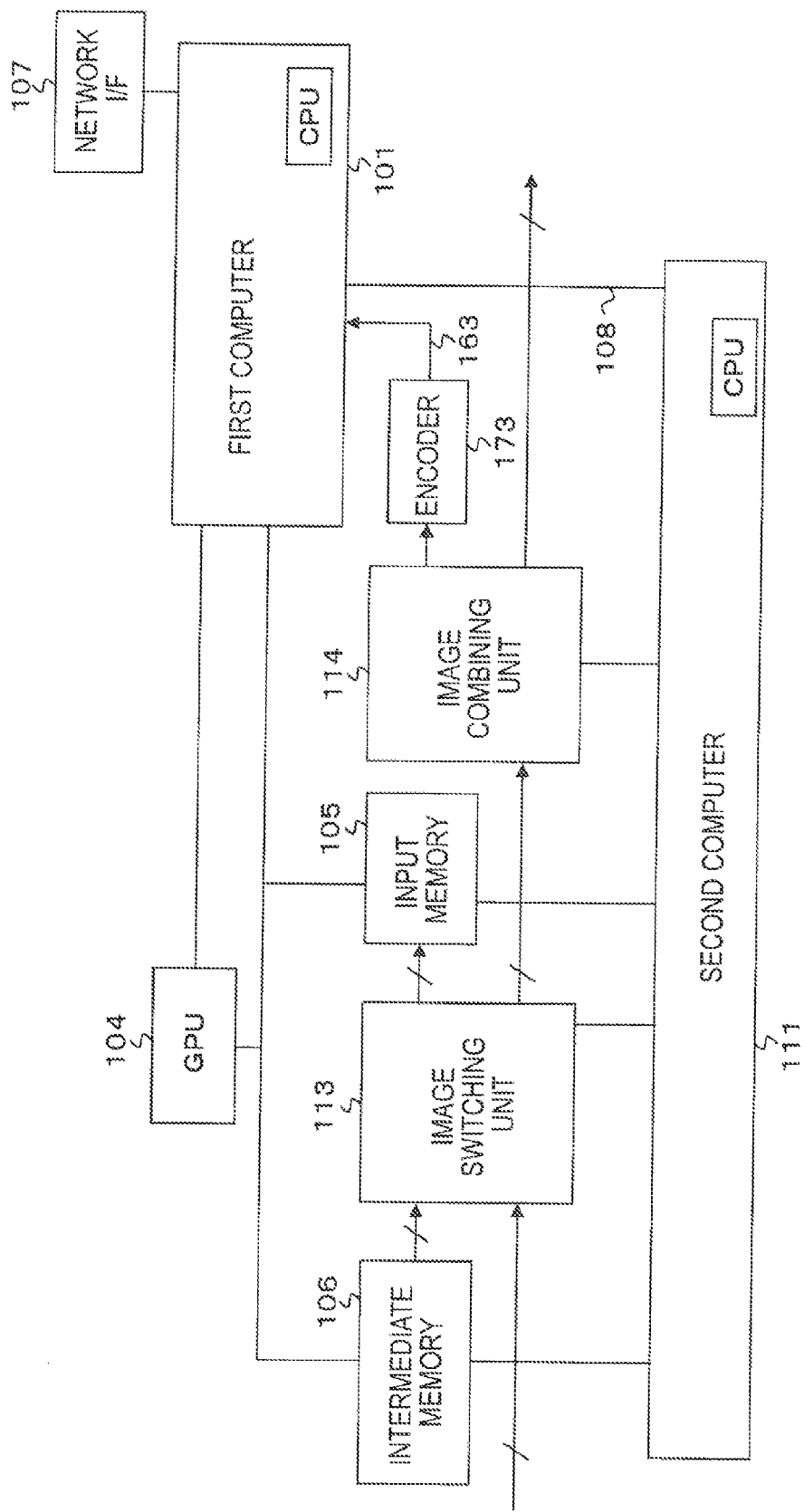
FIG. 23 is a diagram illustrating another example of a path to transmit image data output from an image combining unit to a first computer.

In FIG. 23, an encoder 173 configures an output capture unit. The encoder 173 encodes the image data output from the image combining unit 114 to an MPEG2 transport stream and supplies the MPEG2 transport stream to the first computer 101. When a streaming distribution is performed, it is necessary to perform encoding at any place. An encode process may be executed by the first computer 101. However, if exclusively used hardware is provided like the encoder 173 of FIG. 23, the encode process can be realized with higher performance without increasing load of the first computer 101. In the first computer 101, an output of the encoder 173 may be recorded on a storage unit of the first computer 101.

In the image processing apparatus 100 illustrated in FIG. 1, the user manipulation unit 102 is connected to the first computer 101. However, a user manipulation unit may be connected to the second computer 111, together with the user manipulation unit 102 or instead of the user manipulation unit 102.

Figure 24:
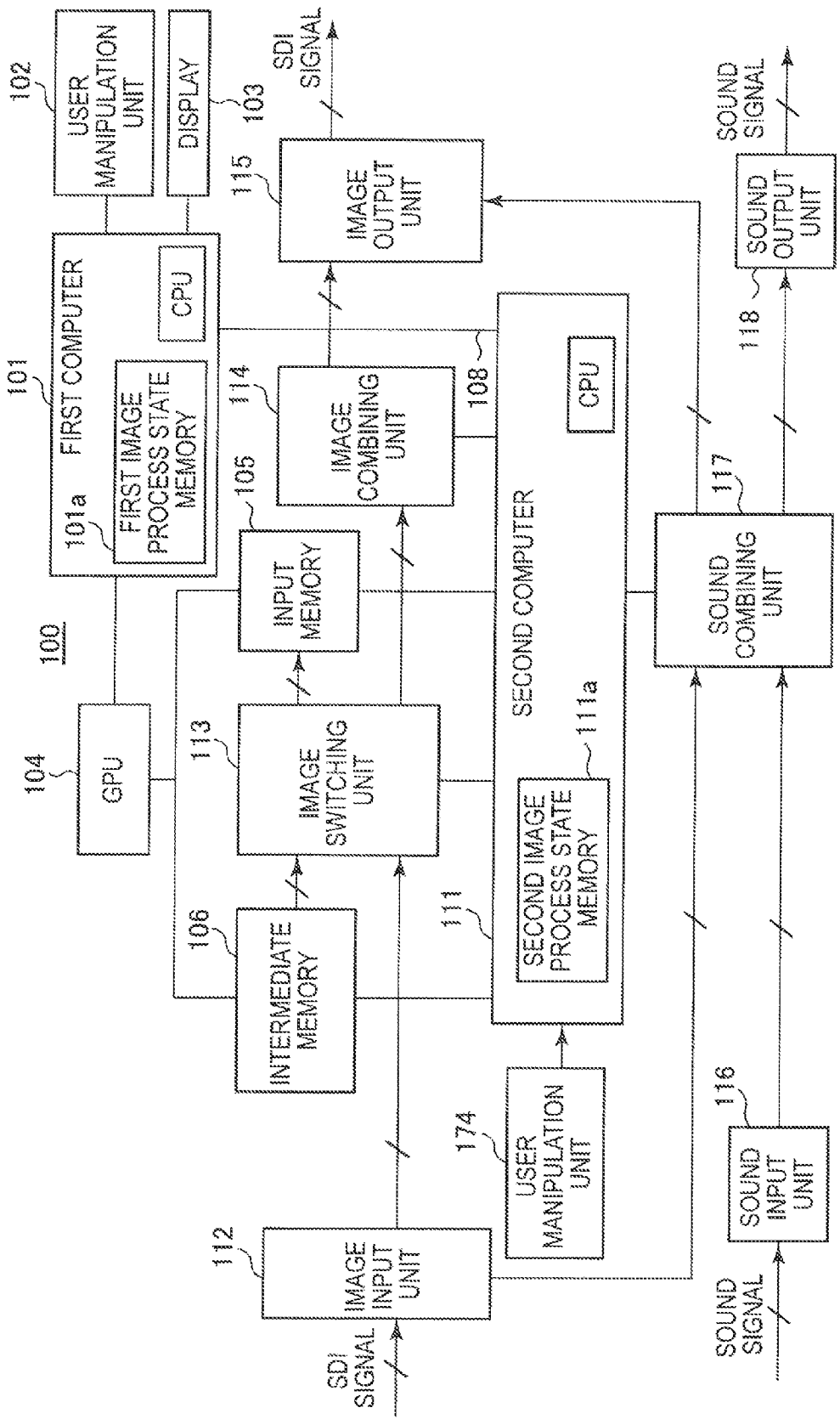
FIG. 24 is a block diagram illustrating another configuration example of an image processing apparatus.

FIG. 24 illustrates a configuration example of the image processing apparatus 100 in which the user manipulation unit 102 is connected to the first computer 101 and a user manipulation unit 174 is connected to the second computer 111. In FIG. 24, structural elements corresponding to the structural elements in FIG. 1 are denoted with the same reference numerals and repeated explanation of these structural elements is omitted. The user manipulation unit 174 includes a row of buttons and can manipulate signal selection in the image switching unit 113. Further, the user manipulation unit 174 may include buttons that can perform a manipulation to provide timing to change a signal process, including an operation state of the GPU 104.

As such, when the user manipulation unit 174 is connected to the second computer 111, the user can perform a manipulation of a recall (restoration) instruction by the user manipulation unit 174. In this case, the recall instruction is transmitted from the user manipulation unit 174 to the second computer 111. Then, the recall instruction is transmitted from the second computer 111 to the first computer 101.

In the embodiment described above, the image data generated by the GPU 104 is written to the intermediate memory 106. However, the same image data as the image data written to the intermediate memory 106 may be written to the embedded memory (internal storage unit) of the first computer 101 by the GPU 104. In this case, the first computer 101 reads the image data from the embedded memory and displays an image based on the image data on the display 103. Thereby, the user can confirm the image based on the image data generated by the GPU 104 on the display 103.

Although not described above, a GPU sharing storage unit accessed from both the GPU 104 and the second computer 111 may be provided, so that the GPU 104 may be controlled from the second computer 111. In this case, the second computer 111 writes the control data regarding the image process state to the GPU sharing storage unit, according to a manipulation input of the user from the user manipulation unit 174 (refer to FIG. 24). The GPU 104 reads the control data from the GPU sharing storage unit and changes an operation state thereof.

Although not described above, the GPU 104 may generate a wipe key signal according to a fader value received from the second computer 111. In this case, the wipe key signal generated by the GPU 104 can be read from the intermediate memory 106, can be input to the image combining unit 114, and can be used for the wipe/transition of the image.

Although not described above, a GPU use mode input manipulation unit may be provided. The GPU use mode input manipulation unit is connected to the second computer 111, similar to the user manipulation unit 174 illustrated in FIG. 24. In this case, in the image switching unit 113 and the image combining unit 114, a mode in which output image data is generated using the image data from the GPU 104 and a mode in which the output image data is generated without using the image data from the GPU 104 are switched by the GPU use mode input manipulation unit.

In the embodiment described above, the input memory 105 that stores the input image data input to the image input unit 112 is provided and the GPU 104 can read necessary image data from the input memory 105 and refer to (use) the image data. However, when the GPU 104 does not refer to the input image data input to the image input unit 112, the input memory 105 is not necessary. That is, the input memory 105 may not be provided.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
a graphics processing unit;
a first computer that controls the graphics processing unit;
an intermediate image storage unit that stores image data generated by the graphics processing unit;
an image input unit that inputs a plurality of image data;
an image switching unit that outputs a plurality of any image data among the plurality of image data input to the image input unit;
an image combining unit that combines image data using the image data output from the image switching unit and the image data stored in the intermediate image storage unit;
an image output unit that outputs the image data combined by the image combing unit;
a second computer that controls the image switching unit and the image combining unit; and
a connecting unit that connects the first computer and the second computer.

(2) The image processing apparatus according to (1), further including:
an image process state storage unit that stores control data of each unit corresponding to a predetermined image process state,
wherein, when a restoration of an image process state is instructed, the first computer performs control to change an image process state of the graphics processing unit based on the control data stored in the image process state storage unit, and the second computer performs control to change image process states of the image switching unit and the image combining unit based on the control data stored in the image process state storage unit, in synchronization with a change of the image process state of the graphics processing unit.

(3) The image processing apparatus according to (2),
wherein a first image process state storage unit provided in a memory attached to the first computer and a second image process state storage unit provided in a memory attached to the second computer are provided as the image process state storage unit, and
wherein control data regarding a portion managed by the first computer is stored in the first image process state storage unit and control data regarding a portion managed by the second computer is stored in the second image process state storage unit.

(4) The image processing apparatus according to (2),
wherein the image process state storage unit is provided in a memory attached to the first computer, and
wherein the second computer receives the control data from the first computer through the connecting unit.

(5) The image processing apparatus according to any one of (2) to (4), further including:
a non-volatile storage that writes the control data stored in the image process state storage unit and stores the control data.

(6) The image processing apparatus according to any one of (2) to (5),
wherein, when storage of the image process state is instructed, control data of the graphics processing unit by the first computer and control data of the image switching unit and the image combining unit by the second computer are stored in the image process state storage unit.

(7) The image processing apparatus according to (6),
wherein a first image process state storage unit provided in a memory attached to the first computer and a second image process state storage unit provided in a memory attached to the second computer are provided as the image process state storage unit,
wherein the first computer writes control data regarding a portion managed by the first computer to the first image process state storage unit, and
wherein the second computer writes control data regarding a portion managed by the second computer to the second image process state storage unit.

(8) The image processing apparatus according to any one of (2) to (7), further including:
a user manipulation unit that is connected to the first computer,
wherein the user manipulation unit has a function of inputting an instruction to restore the image process state, and
wherein when the instruction to restore the image process state is provided by the user manipulation unit, the first computer transmits the instruction to the second computer through the connecting unit.

(9) The image processing apparatus according to any one of (1) to (8), further including:
an input image storage unit that stores the image data input to the image input unit,
wherein the graphics processing unit operates by referring to image data read from the input image storage unit.

(10) The image processing apparatus according to (9),
wherein the input image storage unit stores image data output from the image switching unit.

(11) The image processing apparatus according to any one of (1) to (10),
wherein the graphics processing unit generates image data of a foreground image to be overlapped and a key signal thereof, and
the image combining unit reads the image data of the foreground image and the key signal thereof from the intermediate image storage unit and overlaps the image data of the foreground image to image data of a background image from the image switching unit, based on the key signal.

(12) The image processing apparatus according to any one of (1) to (11), further including:
an input image storage unit that stores image data input to the image input unit,
wherein the first computer transmits image data from the input image storage unit to an internal storage unit and displays an image based on the transmitted image data on a display unit.

(13) The image processing apparatus according to any one of (1) to (12),
wherein the first computer transmits image data from the intermediate image storage unit to an internal storage unit and displays an image based on the transmitted image data on a display unit.

(14) The image processing apparatus according to any one of (1) to (13),
wherein the graphics processing unit writes the same image data as the image data written to the intermediate image storage unit to an internal storage unit of the first computer, and wherein the first computer displays an image based on image data read from the internal storage unit on a display unit.

(15) The image processing apparatus according to any one of (1) to (14), further including:

an output capture unit that captures the image data combined by the image combining unit and supplies the image data to the first computer.

(16) The image processing apparatus according to (15), wherein the first computer displays an image based on image data acquired from the output capture unit on a display unit.

(17) The image processing apparatus according to (15), wherein the output capture unit has an encoder, and wherein the output capture unit encodes the captured image data by the encoder and supplies the image data to the first computer.

(18) The image processing apparatus according to (15), further including:

a network interface, wherein the first computer transmits the image data supplied from the output capture unit in a form of streaming through the network interface.

(19) The image processing apparatus according to any one of (1) to (18), further including:

a sound input unit that inputs a plurality of sound data;

a sound combining unit that combines sound data using the sound data input to the sound input unit; and a sound output unit that outputs the sound data combined by the sound combining unit, wherein the second computer further controls the sound combining unit.

(20) A control method of an image processing apparatus including a graphics processing unit, an intermediate image storage unit that stores image data generated by the graphics processing unit, an image input unit that inputs a plurality of image data, an image switching unit that outputs a plurality of any image data among the plurality of image data input to the image input unit, an image combining unit that combines image data using the image data output from the image switching unit and the image data stored in the intermediate image storage unit, and an image output unit that outputs the image data combined by the image combing unit, the control method including:

controlling the graphics processing unit by a first computer and controlling the image switching unit and the image combining unit by a second computer connected to the first computer.

What is claimed is:

1. An image processing apparatus comprising:
a graphics processing unit (GPU) exhibiting an image process state that processes image data to perform special video effects on the image data;
a first computer that controls the graphics processing unit;
an intermediate image storage unit that stores image data generated by the graphics processing unit;
an image input unit that provides input image data;
an image switching unit that is supplied with input image data and stored image data and exhibiting an image process state to selectively output a plurality of image data;
an image combining unit that is supplied with the image data output from the image switching unit and exhibiting an image process state to combine the image data stored in the intermediate image storage unit and the input image data;
an image output unit that outputs the image data combined by the image combing unit;
a second computer that controls the image switching unit and the image combining unit;
a connecting unit that connects the first computer and the second computer to synchronize the operations of the first and second computers with the image data processed by the graphics processing unit; and
an image process state storage unit that stores GPU control data, image switching unit control data and image combining unit control data corresponding to a predetermined image process state of the respective GPU, image switching unit and image combining unit,
wherein, when a restoration of an image process state is instructed, the first computer causes a change in the image process state of the graphics processing unit based on the GPU control data stored in the image process state storage unit, and the second computer causes a change in the image process states of the image switching unit and the image combining unit based on the image switching unit control data and the image combining unit control data, respectively, stored in the image process state storage unit, in synchronization with the change of the image process state of the graphics processing unit.

2. The image processing apparatus according to claim 1, wherein the image process state storage unit comprises a first image process state storage unit provided in a memory attached to the first computer and a second image process state storage unit provided in a memory attached to the second computer, and
wherein control data regarding processes managed by the first computer is stored in the first image process state storage unit and control data regarding processes managed by the second computer is stored in the second image process state storage unit.

3. The image processing apparatus according to claim 1, wherein the image process state storage unit is provided in a memory attached to the first
wherein the second computer receives the control data from the first computer through the connecting unit.

4. The image processing apparatus according to claim 1, further comprising:
a non-volatile storage that writes the control data stored in the image process state storage unit and stores the control data.

5. The image processing apparatus according to claim 1, wherein, when storage of the image process state is instructed, the GPU control data and the image switching unit control data and the image combining unit control data stored in the image process state storage unit.

6. The image processing apparatus according to claim 5, wherein the image process state storage unit comprises a first image process state storage unit provided in a memory attached to the first computer and a second image process state storage unit provided in a memory attached to the second computer,
wherein the first computer writes control data regarding a portion managed by the first computer to the first image process state storage unit, and
wherein the second computer writes control data regarding a portion managed by the second computer to the second image process state storage unit.

7. The image processing apparatus according to claim 1, further comprising:

a user manipulation unit connected to the first computer that inputs an instruction to restore the image process state, and wherein when the instruction to restore the image process state is provided by the user manipulation unit, the first computer transmits the instruction to the second computer through the connecting unit.

8. The image processing apparatus according to claim 1, further comprising:

an input image storage unit that stores the image data input to the image input unit, wherein the graphics processing unit operates by referring to image data read from the input image storage unit.

9. The image processing apparatus according to claim 8, wherein the input image storage unit stores image data output from the image switching unit.

10. The image processing apparatus according to claim 1, wherein the graphics processing unit generates image data of a foreground image to be overlapped and a key signal thereof, and the image combining unit reads the image data of the foreground image and the key signal thereof from the intermediate image storage unit and overlaps the image data of the foreground image to image data of a background image from the image switching unit, based on the key signal.

11. The image processing apparatus according to claim 1, further comprising:

an input image storage unit that stores image data input to the image input unit, wherein the first computer transmits image data from the input image storage unit to an internal storage unit and displays an image based on the transmitted image data on a display unit.

12. The image processing apparatus according to claim 1, wherein the first computer transmits image data from the intermediate image storage unit to an internal storage unit and displays an image based on the transmitted image data on a display unit.

13. The image processing apparatus according to claim 1, wherein the graphics processing unit writes the same image data as the image data written to the intermediate image storage unit to an internal storage unit of the first computer, and wherein the first computer displays an image based on image data read from the internal storage unit on a display unit.

14. The image processing apparatus according to claim 1, further comprising:

an output capture unit that captures the image data combined by the image combining unit and supplies the image data to the first computer.

15. The image processing apparatus according to claim 14, wherein the first computer displays an image based on image data acquired from the output capture unit on a display unit.

16. The image processing apparatus according to claim 14, wherein the output capture unit has an encoder, and wherein the output capture unit encodes the captured image data by the encoder and supplies the image data to the first computer.

17. The image processing apparatus according to claim 14, further comprising:

a network interface, wherein the first computer transmits the image data supplied from the output capture unit through the network interface as streaming data.

18. The image processing apparatus according to claim 1, further comprising:

a sound input unit that inputs a plurality of sound data;

a sound combining unit that combines sound data using the sound data input to the sound input unit; and a sound output unit that outputs the sound data combined by the sound combining unit, wherein the second computer further controls the sound combining unit.

19. A control method of an image processing apparatus including a graphics processing unit (GPU) exhibiting an image process state that processes image data to perform special video effects on the image data, an intermediate image storage unit that stores image data generated by the graphics processing unit, an image input unit that provides input image data, an image switching unit exhibiting an image process state that selectively outputs a plurality of image data, an image combining unit exhibiting an image process state that combines image data from the image switching unit and the image data stored in the intermediate image storage unit, and an image output unit that outputs the image data combined by the image combing unit, the control method comprising:

controlling the graphics processing unit by a first computer and controlling the image switching unit and the image combining unit by a second computer connected to the first computer;

synchronizing the operations of the first and second computers with the image data processed by the graphics processing unit; and storing GPU control data, image switching unit control data and image combining unit control data corresponding to a predetermined image process state of the respective GPU, image switching unit and image combining unit, wherein, when a restoration of an image process state is instructed, the first computer causes a change in the image process state of the graphics processing unit based on the GPU control data stored in the image process state storage unit, and the second computer causes a change in the image process states of the image switching unit and the image combining unit based on the image switching unit control data and the image combining unit control data, respectively, stored in the image process state storage unit, in synchronization with the change of the image process state of the graphics processing unit.

* * * * *